(12) United States Patent
Bell et al.

(10) Patent No.: US 9,592,913 B2
(45) Date of Patent: Mar. 14, 2017

(54) LIGHTWEIGHT AIRCRAFT PASSENGER SEAT ASSEMBLY

(71) Applicant: Composite Designs EU GmbH, Hürth (DE)

(72) Inventors: Duncan Bell, Lohmar (DE); Philip Hall, Köln (DE); Rocco Passari, Hürth (DE)

(73) Assignee: Composite Designs EU GmbH (DE)

( * ) Notice: Subject to any disclaimer, the term of this patent is extended or adjusted under 35 U.S.C. 154(b) by 0 days.

(21) Appl. No.: 14/181,809

(22) Filed: Feb. 17, 2014

(65) Prior Publication Data
US 2014/0232153 A1   Aug. 21, 2014

(30) Foreign Application Priority Data

Feb. 19, 2013  (EP) ..................................... 13000841

(51) Int. Cl.
  *B64D 11/06*   (2006.01)
  *B29C 70/54*   (2006.01)

(52) U.S. Cl.
  CPC ............ *B64D 11/06* (2013.01); *B29C 70/545* (2013.01); *B64D 11/0647* (2014.12); *B64D 11/0648* (2014.12); *B64D 11/0649* (2014.12); *B64D 11/0696* (2013.01); *Y02T 50/46* (2013.01)

(58) Field of Classification Search
  CPC ............ B64D 11/0696; B64D 11/0647; B64D 11/0648
  USPC .................................. 297/232, 216.1, 216.16
  See application file for complete search history.

(56) References Cited

U.S. PATENT DOCUMENTS

| | | | |
|---|---|---|---|
| 4,349,167 A |   | 9/1982 | Reilly |
| 4,375,300 A | * | 3/1983 | Long et al. .................... 297/232 |
| 4,489,978 A | * | 12/1984 | Brennan ........................ 297/232 |
| 4,718,719 A | * | 1/1988 | Brennan .................... 297/216.2 |

(Continued)

FOREIGN PATENT DOCUMENTS

| | | |
|---|---|---|
| CA | 2626278 A1 | 9/2008 |
| CN | 101886735 A | 11/2010 |

(Continued)

OTHER PUBLICATIONS

Extended European Search Report for Application No. EP 13 00 0841 dated Oct. 24, 2013 (6 pages).

(Continued)

*Primary Examiner* — Timothy J Brindley
(74) *Attorney, Agent, or Firm* — Harness, Dickey & Pierce, P.L.C.

(57) ABSTRACT

A lightweight aircraft passenger seat assembly comprises at least one seat portion and at least one supporting portion for supporting the at least one seat portion relative to an aircraft structure. In order to provide an improved lightweight aircraft passenger seat assembly having a reduced weight, size and complexity as compared to conventional lightweight passenger seat designs, the invention provides a lightweight aircraft passenger seat assembly, comprising at least one seat portion with at least one seat shell for an aircraft passenger and at least one supporting portion for supporting the at least one seat portion relative to an aircraft structure, wherein the at least one seat shell and the at least one supporting portion are constructed as lightweight components.

14 Claims, 33 Drawing Sheets

(56) References Cited

U.S. PATENT DOCUMENTS

| | | | |
|---|---|---|---|
| 5,058,829 A | | 10/1991 | Bentley |
| 5,069,505 A | * | 12/1991 | Amthor et al. ............ 297/216.2 |
| 5,152,578 A | * | 10/1992 | Kiguchi ................... 297/216.16 |
| 5,553,923 A | * | 9/1996 | Bilezikjian ................ 297/452.2 |
| 6,513,756 B1 | * | 2/2003 | Lambiaso .................... 244/119 |
| 7,232,096 B1 | * | 6/2007 | Ahad ......................... 244/118.6 |
| 7,628,357 B2 | | 12/2009 | Mercier et al. |
| 8,550,564 B1 | * | 10/2013 | Kismarton et al. ...... 297/452.55 |
| 2003/0094542 A1 | * | 5/2003 | Williamson .............. 244/122 R |
| 2003/0094840 A1 | | 5/2003 | Williamson |
| 2004/0212243 A1 | * | 10/2004 | Johnson ................... 297/452.18 |
| 2005/0264085 A1 | * | 12/2005 | Schumacher et al. ... 297/452.18 |
| 2008/0017755 A1 | * | 1/2008 | Kennedy et al. .......... 244/118.5 |
| 2008/0150342 A1 | | 6/2008 | Kismarton et al. |
| 2008/0282523 A1 | | 11/2008 | Kismarton et al. |
| 2008/0290242 A1 | | 11/2008 | Kismarton et al. |
| 2009/0084925 A1 | * | 4/2009 | Kismarton ................ 248/503.1 |
| 2010/0096502 A1 | * | 4/2010 | VanderWolk ............. 244/122 R |
| 2010/0140999 A1 | | 6/2010 | Kladde |
| 2010/0289318 A1 | | 11/2010 | Le et al. |
| 2011/0108666 A1 | | 5/2011 | Pozzi et al. |
| 2011/0233339 A1 | * | 9/2011 | Plant et al. ................... 244/131 |
| 2013/0307310 A1 | | 11/2013 | Saada et al. |
| 2014/0170370 A1 | * | 6/2014 | Horii ....................... B32B 18/00 428/113 |
| 2014/0375090 A1 | * | 12/2014 | Wegenka et al. ......... 297/188.09 |
| 2015/0192162 A1 | * | 7/2015 | Jones ............................. 403/27 |

FOREIGN PATENT DOCUMENTS

| | | |
|---|---|---|
| EP | 0495318 A1 | 7/1992 |
| EP | 1593491 A1 | 11/2005 |
| EP | 1719701 A1 | 11/2006 |
| FR | 2 970 945 A1 | 8/2012 |
| GB | 2330614 A | 4/1999 |
| JP | 61-500486 | 3/1986 |
| WO | WO-85-02384 A1 | 6/1985 |
| WO | WO-2012-104248 A2 | 8/2012 |
| WO | WO-2012-169906 A1 | 12/2012 |

OTHER PUBLICATIONS

Extended European Search Report for Application No. EP 13 00 6063 dated Jun. 27, 2014 (7 pages).
Extended European Search Report for Application No. EP 13 00 6065 dated Jul. 22, 2014 (6 pages).
Extended European Search Report for Application No. EP 14 00 0146 dated Jul. 8, 2014 (6 pages).
Extended European Search Report for Application No. EP 14 00 0147 dated Jul. 10, 2014 (6 pages).
PCT Notification of Transmittal of The International Search Report and The Written Opinion of the International Searching Authority, or the Declaration for International Application No. PCT/EP2014/053007 dated May 30, 2014 (11 pages).
Extended European Search Report for Application No. EP 13 00 6064 dated Jun. 2, 2014 (7 pages).
Office Action for Russian Patent Application No. 2014105670 dated Dec. 23, 2014 (8 pages).
Canadian Office Action for Application No. 2,843,059 dated Mar. 19, 2015 (3 pages).
Japanese Office Action for Application No. 2014-027149 dated Mar. 3, 2015 with English translation (9 pages).
Office Action for Chinese Patent Application No. 201410053899.3 dated Jul. 27, 2013 and translation (22 pages).
Canadian Office Action for Application No. 2,843,059 dated Feb. 3, 2016 (2 pages).
Japanese Office Action for Application No. 2014-027149 dated Dec. 22, 2015 with English translation (6 pages).
Second Office Action for Chinese Patent Application No. 201410053899.3 dated May 11, 2016 and Translation (11 pages).

* cited by examiner

LIGHTWEIGHT AIRCRAFT PASSENGER SEAT ASSEMBLY

TECHNICAL FIELD

The invention relates to a lightweight aircraft passenger seat assembly, comprising at least one seat portion and at least one supporting portion for supporting the at least one seat portion relative to an aircraft structure.

BACKGROUND

Conventional aircraft passenger seat assemblies regularly comprise a support structure with two cross beams extending in the aircraft's widthwise orientation and supported by legs, wherein armrest hangers and passenger seats are alternately attached alongside the two cross beams so as to form an aircraft passenger seat assembly with several seats. Since the legs, the cross beams, the hangers and the framework of the seats are regularly made from heavy metal components, the conventional aircraft passenger seat assemblies significantly contribute to the overall weight of an aircraft, and limit the overall seating capacity and profitability, respectively, of commercially operated aircrafts.

A need for having a lightweight aircraft passenger seat with smaller fore-aft dimensions compared to conventional passenger seat designs has been identified and satisfied e.g. by the documents US 2007/267543 A, US 2008/150342 A, US 2008/282523 A or US 2008/290242 A.

However, these known solutions still leave room for considerable reductions in weight, size and complexity of the lightweight aircraft passenger seat assembly. A reduction in weight and size of the lightweight aircraft passenger seat assembly may allow the aircraft to carry more passenger seat assemblies and more passengers, respectively, thus increasing the potential profitability of the aircraft. A reduction in complexity of the passenger seat assembly may additionally allow the production and/or maintenance at lower costs, thus rendering the lightweight aircraft passenger seat assembly even more attractive to airlines as compared to the conventional aircraft passenger seat assemblies using heavy metal components.

The object of the invention is therefore to provide an improved lightweight aircraft passenger seat assembly having a reduced weight, size and complexity as compared to conventional lightweight passenger seat designs.

Likewise it is the object of the invention to reduce the weight, size and complexity of the lightweight aircraft passenger seat assembly on the component level and to provide at least one lightweight aircraft passenger seat assembly component having a reduced weight, size and complexity as compared to conventional lightweight passenger seat assembly components, or to provide at least one lightweight aircraft passenger seat assembly component which allows other components to have a reduced weight, size and complexity as compared to conventional lightweight passenger seat assembly components.

SUMMARY

In order to solve the above-defined object, the first aspect of the invention provides the lightweight aircraft passenger seat assembly comprising at least one seat portion with at least one seat shell for an aircraft passenger and at least one supporting portion for supporting the at least one seat portion relative to an aircraft structure, wherein the at least one seat shell and the at least one supporting portion are constructed as lightweight components. The expression "lightweight component" as used herein is understood to include components which are designed in a weight and/or material saving manner and/or made from lightweight materials, including, for example, any type of fiber reinforced composite materials, any type of plastic materials and/or any type of light metals, particularly aluminium, with a sufficient inherent stability for use in the aero-space industry.

The lightweight aircraft passenger seat assembly according to the invention may particularly be designed as a seat assembly for economy class passengers in short-haul aircrafts. The lightweight seat shell may have a particularly simple design and may preferably be substantially rigid in itself, thus providing limited options of adjustability. In short-haul aircrafts, this drawback is generally acceptable in view of the rather short flight times. However, on the other hand, the limited possibilities of adjustment allow a significant reduction of the complexity of the lightweight aircraft passenger seat assembly. This has been realized by the invention in the form of the simple design of the seat assembly with basically only the seat shell and the support for the seat shell as primary components. Since these primary components are constructed as lightweight components with a simple design, the weight, size and complexity of the inventive lightweight aircraft passenger seat assembly can still be significantly reduced as compared to the conventional lightweight aircraft passenger seat designs. Also, the limited adjustability of the seat shell allows complex adjustment mechanisms to be dispensed with.

Moreover, the supporting portion and the seat shell of the inventive lightweight aircraft passenger seat assembly may be coupled together easily so as to allow relative movements of the seat shell and the supporting portion in order to provide sufficient yielding and resilience characteristics for deformation under exceptional load conditions. This is particularly relevant in terms of approval of the inventive lightweight aircraft passenger seat assembly for civil aviation applications according to SAE AS 8049B-2005, which is a qualification for aircraft components and involves dynamic tests under a load of 14G downward and 16G forward.

In the description of the invention, terms from the word stems "coupling" or "supporting" will be understood as describing a direct or indirect link between two elements, whereas the terms from the word stems "connecting" or "attaching" or "securing" will be understood as describing a direct link between two elements.

In the description of the invention, terms from the word stem "bonding" will be understood as describing any type of connection between two separate components or bodies, including "welding" or "adhesive bonding".

Furthermore, in the description of the invention, terms from the word stem "integral" will be understood as describing any component or body made as "one continuous piece", whereas different components or bodies or portions thereof may be bonded, in particular, welded together to form an "integral" component or body in the sense of the invention.

On the other hand, in the description of the invention, terms from the word stem "one-piece construction" will be understood as describing any component or body originally made as "one piece", excluding the possibility to bond or weld different components or bodies together to form a "one-piece construction" in the sense of the invention.

Further to this, in the description of the invention, terms from the word stem "monolithic" will be understood as describing any component or body made from one "construction material", whereas fiber reinforced materials, including a fiber material different from a matrix material, will be regarded as one "construction material", though, any "sandwich constructions" with a core different than the outer sandwich layers may not be regarded as "monolithic" in the sense of the invention.

Accordingly, a "monolithic" component or body may be an "integral" component or body or may also be a "one-piece construction" in the sense of the invention.

Moreover, in the description of the invention, terms from the word stem "fiber orientation" will be understood as describing the "main fiber orientation" of a component or body made from a fiber reinforced material, wherein the respective component or body may have other fibers with an orientation other than the "main fiber orientation". Finally, in the description of the invention, terms from the word stem "symmetrical" will be understood as describing any type of components or bodies which are "mostly symmetrical", thus not being limited to symmetry in a mathematical sense, whereas "symmetrical" may refer to a "mirror symmetrical", a "rotationally symmetrical" or a "point symmetrical" relation.

Preferred embodiments of the lightweight aircraft passenger seat assembly according to the present invention are claimed in the subclaims.

In the following, preferred aspects of the invention will be described.

Each one of the following aspects of the invention relates to a component for a lightweight aircraft passenger seat assembly, which is disclosed and may thus be claimed individually or in combination with at least another aspect of the invention, in particular in combination with the lightweight aircraft passenger seat assembly according to the first aspect of the invention and/or in combination with at least another lightweight aircraft passenger seat assembly component according to at least another one of the second to the last aspects of the invention. The applicant reserves the right to render each one of the following aspects of the invention the subject of one or more divisional applications.

The individual features disclosed for a generic type of a lightweight aircraft passenger seat assembly component (e.g. second aspect; lightweight aircraft passenger seat assembly component) may be seen as disclosed in context with and attributed with any type of lightweight aircraft passenger seat assembly component referred to hereinafter.

The individual features disclosed for a specific type of a lightweight aircraft passenger seat assembly component (e.g. supporting portion) in context with the following aspects of the invention (e.g. third aspect: a supporting portion has a leg portion; fifth aspect: a supporting portion has a frame portion) may be seen as disclosed in context with and attributed to the same lightweight aircraft passenger seat assembly component (i.e. the same supporting portion has a leg portion and a frame portion) or to different lightweight aircraft passenger seat assembly components of the same type (a first supporting portion has a leg portion and a second supporting portion has a frame portion).

A second aspect of the invention relates to a component for a lightweight aircraft passenger seat assembly, preferably in combination with the first aspect of the invention, wherein the lightweight component satisfies at least one of the following features:

The lightweight component forms an integral and/or monolithic body.
The lightweight component is a one-piece construction.
The lightweight component is made from fiber reinforced composite material, preferably a laminated fiber reinforced composite material.
The lightweight component is made from a prepreg.
The lightweight component comprises glass fibers, carbon fibers, ceramic fibers, aramid fibers, boron fibers, steel fibers, natural fibers and/or poly-amid fibers.
The lightweight component comprises a matrix made from a polymer, preferably from a thermosetting polymer, an elastomer or a thermosoftening plastic, or a ceramic or a metal, preferably a light metal, or carbon.
The lightweight component comprises a first fiber layer and a second fiber layer, preferably arranged adjacent to the first fiber layer, wherein the first fiber layer is made from a different material than the second fiber layer.
The lightweight component comprises a first fiber layer and a second fiber layer, preferably arranged adjacent to the first fiber layer, wherein the first fiber layer has a smaller thickness than the second fiber layer.
The lightweight component comprises a first fiber layer and a second fiber layer, preferably arranged adjacent to the first fiber layer, wherein the first fiber layer is a primary fiber layer and the second fiber layer is an enforcement fiber layer, wherein preferably the enforcement fiber layer has a greater thickness than the primary fiber layer.
The lightweight component comprises a first fiber layer and a second fiber layer, preferably arranged adjacent to the first fiber layer, wherein the first and the second fiber layer have the same fiber orientations.
The lightweight component comprises a first fiber layer and a second fiber layer, preferably arranged adjacent to the first fiber layer, wherein the first fiber layer has a different fiber orientation than the second fiber layer.
The lightweight component comprises a first fiber layer and a second fiber layer, preferably arranged adjacent to the first fiber layer, wherein the fiber orientation of the first layer is arranged at an angle of 30°, 45°, 60°, 75°, 90°, 105°, 120°, 135°, 150° or 165° relative to the fiber orientation of the second layer, in each case with a tolerance of +/−5°, preferably +/−2°.
The lightweight component comprises a plurality of fiber layers, wherein the different fiber layers are configured in more than two fiber orientations, preferably three fiber orientations, more preferably in four fiber orientations.
The lightweight component comprises a first fiber layer and a second fiber layer, preferably arranged adjacent to the first fiber layer, wherein the second fiber layer covers a smaller area than the first layer.
The lightweight component comprises at least three fiber layers, wherein the second fiber layer is arranged between the first and the third fiber layer and wherein the second fiber layer covers the same or a smaller area than the first fiber layer and/or the third fiber layer covers the same or a smaller area than the second fiber layer.
The lightweight component comprises a first fiber layer and a second fiber layer, preferably arranged adjacent to the first fiber layer, wherein the fiber layers are made from the same material, have the same thickness and/or cover the same area.
The lightweight component comprises a first fiber layer, a second fiber layer, preferably arranged adjacent to the first fiber layer, and at least a force transmission portion for transmitting forces between two layer portions, wherein the force transmission portion is at least partially reinforced by the second fiber layer.

The lightweight component comprises a first fiber layer, a second fiber layer, preferably arranged adjacent to the first fiber layer, and at least a force application portion for the application of forces to the lightweight component, wherein the first fiber layer comprises a cut-out in the area of the force application portion and wherein the force application portion is covered by the second fiber layer.

The lightweight component comprises a first fiber layer and a second fiber layer, preferably arranged adjacent to the first fiber layer, wherein at least the first fiber layer comprises portions, preferably with different fiber orientations, adjoining each other in a butt-join, wherein the butt-join of the first fiber layer is covered by a continuous portion of the second layer.

The lightweight component comprises a first fiber layer and a second fiber layer, preferably arranged adjacent to the first fiber layer, wherein each fiber layer comprises portions, preferably with different fiber orientations, adjoining each other in a butt-join, wherein the butt-join of the first fiber layer is arranged at a distance to the butt-join of the second layer in an orientation parallel to the layers.

The lightweight component comprises at least one first fiber layer comprising portions with different or identical fiber orientations, which portions overlap along an adjoining region.

The lightweight component comprises a first portion, a second portion and at least one fiber layer, wherein the first portion and the second portion are arranged at an angle to each other and are connected along an edge and wherein the at least one fiber layer is intersected by a butt-join, which runs along the edge between the first and the second portion.

The lightweight component comprises a first portion, a second portion and at least one fiber layer, wherein the first portion and the second portion are arranged at an angle to each other and are connected along an edge and wherein the at least one fiber layer is free of intersections in the area of the edge and/or in the area adjacent to the edge.

At least one of the above features allows an optimization of a weight vs. stability ratio of the lightweight component and/or a particularly high stability of the component in different load and/or torsion directions and/or a high stability between different portions of the component, particularly in the transition region between different component portions, and/or a strong connection to adjacent components.

The expression "fiber reinforced composite material" as used herein and in the following is understood to include at least one fiber reinforced composite material and different fiber reinforced composite materials.

A third aspect of the invention relates to a supporting portion for a lightweight aircraft passenger seat assembly, preferably in combination with at least one of the preceding aspects of the invention, wherein the supporting portion comprises at least one leg portion which satisfies at least one of the following features:

The leg portion forms an integral and/or monolithic body.
The leg portion is a one-piece construction.
The leg portion has at least one leg, preferably two or more legs, more preferably four legs.
The leg portion has at least one leg which is hollow and/or comprises at least one opening.
The leg portion has at least one leg which tapers toward a distal end thereof.
The leg portion comprises at least two separate bodies, which are bonded, preferably welded, together to form an integral body, wherein the separate bodies are preferably one piece constructions.
The leg portion comprises two symmetrical halves, preferably split down the center plane, which are bonded, preferably welded, together to form an integral body, wherein the symmetrical halves are preferably one piece constructions.
The leg portion comprises more than two separate bodies, wherein the separate bodies preferably form integral and/or monolithic bodies and/or wherein the separate bodies are preferably one piece constructions.
The leg portion comprises an internal structure body and two symmetrical halves, preferably split down the center plane, which are bonded, preferably bolted and/or welded, together, wherein the internal structure body and/or the symmetrical halves are preferably one piece constructions, wherein the symmetrical halves at least sectionwise encapsulate the internal structure body and/or wherein the two symmetrical halves at least sectionwise form an open profile.
The leg portion comprises at least one leg, preferably more than one leg, more preferably exactly four legs, particularly a first leg, a second leg, a third leg and a fourth leg, wherein the at least one leg is at least sectionwise formed by an internal structure body and two symmetrical halves, which at least sectionwise encapsulate the internal structure body.
The leg portion comprises two legs which are connected to extend along a continuous line, preferably along a straight line, and preferably to extend between a front frame-side connecting portion and a rear aircraft-side coupling portion.
The leg portion comprises at least one leg, which branches-off from another leg, preferably downward to a front aircraft-side coupling portion and/or upward to a rear frame-side connecting portion.
The leg portion comprises a first leg, a second leg, a third leg and a fourth leg, wherein the second leg and the third leg are connected to extend along a continuous line, wherein the first leg branches-off from the third leg and wherein the fourth leg branches-off from the second leg.
The leg portion comprises a first leg, a second leg, a third leg and a fourth leg, wherein preferably the first leg and the third leg are configured to be oriented forward with respect to the aircraft's longitudinal orientation and the second leg and the fourth leg are configured to be oriented rearward with respect to the aircraft's longitudinal orientation.
The leg portion comprises four legs, wherein each leg is at least sectionwise formed by an internal structure body and two symmetrical halves, which at least sectionwise encapsulate the internal structure body, wherein the two symmetrical halves at least sectionwise form an open profile, wherein preferably the symmetrical halves in the area forming the first and/or the third leg and/or encapsulating the portion of the internal structure body of the first and/or the third leg form an open profile being open in the forward direction with respect to the aircraft's longitudinal orientation and/or wherein the symmetrical halves in the area forming the second and/or the fourth leg and/or encapsulating the portion of the internal structure body of the second and/or the fourth leg form an open profile being open in the rearward direction with respect to the aircraft's longitudinal orientation.

The leg portion comprises four legs, wherein each leg is at least sectionwise formed by an internal structure body and two symmetrical halves, which at least sectionwise encapsulate the internal structure body, wherein the two symmetrical halves at least sectionwise form an open profile, wherein preferably the symmetrical halves in the area forming the first and/or the third leg and/or encapsulating the internal structure body of the first and/or the third leg form an open profile being closed in the rearward direction with respect to the aircraft's longitudinal orientation and/or wherein the symmetrical halves in the area forming the second and/or the fourth leg and/or encapsulating the portion of the internal structure body of the second and/or the fourth form an open profile being closed in the forward direction with respect to the aircraft's longitudinal orientation.

The leg portion comprises four legs, wherein the first leg branches-off from the third leg and the length axis of the first leg and the length axis of the third leg are arranged at an angle of more than 90°, preferably more than 100° and preferably less than 120°, more preferably less than 110°, and/or wherein the fourth leg branches-off from the second leg and the length axis of the second leg and the length axis of the fourth leg are arranged at an angle of more than 90°, preferably more than 100° and preferably less than 120°, more preferably less than 110°.

The leg portion has at least one leg to be coupled with an aircraft structure, preferably two legs to be coupled with an aircraft structure, wherein preferably a first leg is configured to be oriented forward with respect to the aircraft's longitudinal orientation and a second leg is configured to be oriented rearward with respect to the aircraft's longitudinal orientation, wherein both legs are preferably configured to be coupled with the same rail installed at an aircraft floor.

The leg portion has at least one leg to be engaged with a frame portion, preferably two legs be engaged with a frame portion, wherein preferably a third leg is configured to be oriented forward with respect to the aircraft's longitudinal orientation and a fourth leg is configured to be oriented rearward with respect to the aircraft's longitudinal orientation, wherein preferably both legs are configured to be engaged with the same frame portion.

The leg portion is configured to connect to a frame portion of the supporting portion, wherein the leg portion preferably connects to a loop portion of the frame portion and/or to a portion of the frame portion apart from a beam portion.

The leg portion comprises at least one male and/or female engagement feature for establishing a form-fit, preferably in an orientation perpendicular to a length orientation of the male and/or female engagement feature, and/or a non-positive connection, preferably in a length orientation of the male and/or female engagement feature, together with at least a corresponding one female and/or male engagement feature of a frame portion, wherein the at least one male and/or female engagement feature is preferably located at the distal end of at least one leg of the leg portion and/or is located on a mating surface of the leg portion which abuts to a mating surface of the frame portion, wherein the mating surface of the leg portion is preferably flat.

The leg portion is bonded to a frame portion, preferably at the position of the at least one male and/or at least one female engagement feature and/or at the position of the at least one mating surface of the leg portion.

The leg portion comprises at least a recess for receiving a frame coupling element, which is configured to couple the leg portion with the frame portion of the seat assembly, preferably with a leg coupling fixture of the frame portion.

The leg portion comprises at least a recess for receiving a foot portion, particularly a floor coupling element, which is configured to couple the leg portion with an aircraft structure, preferably to a rail provided at an aircraft floor.

The leg portion comprises more than one recess, preferably four recesses for receiving frame and floor coupling elements, wherein the recesses are preferably formed by the free ends of the legs, wherein preferably a frame and/or floor coupling element is fixedly attached within at least one of the recesses, more preferably within each one of the four recesses, wherein preferably a frame coupling element is fixedly attached within each one of the free ends of the third leg and the fourth leg.

The leg portion comprises at least one frame coupling element being fixedly attached within a recess at the free end of at least one of the third and the fourth leg, wherein the at least one frame coupling element preferably comprises a supporting portion, which is inserted into the recess of the respective leg, and a connecting portion with a through hole for a bolt or a screw, wherein the supporting portion preferably has an exterior shape being complementary to an interior shape of the at least one leg, so as to fit snugly into said leg.

The leg portion comprises at least one frame coupling element being fixedly attached within a recess at the free end of at least one of the third and the fourth leg, wherein the at least one frame coupling element forms a rotary joint which is configured to rotate the frame portion relative to the leg portion, wherein the axis of rotation of the rotary joint is preferably substantially parallel, including a tolerance of up to 20°, to an aircraft floor, preferably parallel to the aircraft's pitch axis and/or roll axis, wherein the rotary joint preferably enables rotation of the frame portion relative to the frame portion by an angle of up to +10° and/or −10°, preferably at least +5° and/or −5° and preferably of up to +15° and/or −15°, as measured from a regular position.

The leg portion is identical to at least another leg portion of the supporting portion.

The leg portion has at least one leg, comprising a base section and at least one flank section arranged at an angle to the base section, wherein the base section and the at least one flank section are connected via an edge or a rounded edge and wherein preferably the edge or rounded edge extends substantially along the length axis of the leg, including a deviation of up to 20°, preferably up to 15°, more preferably up to 10°, more preferably up to 5° and more preferably up to 2°.

The leg portion has at least one leg, comprising a base section and at least a first and a second flank section each arranged at an angle to the base section, wherein the first and the second flank section are connected to the base section via edges or rounded edges being arranged at opposite ends of the base section in an orientation perpendicular to the length axis of the leg, wherein the flank sections are preferably angled to the same side of the base section.

The leg portion has at least one leg, wherein the leg in a cross-section oriented perpendicular to its length axis forms an octagon with two base sections and three flank section pairs, wherein the two base sections are preferably arranged parallel to each other, wherein the flank sections of each flank section pair are preferably arranged parallel to each other, wherein the base sections are preferably arranged perpendicular to one of the flank section pairs and wherein the cross-sectional edge lengths of the base sections are preferably greater than the cross-sectional edge lengths of the flank sections.

The leg portion has at least two legs, wherein one of the legs branches-off from another leg at an angle and wherein at least one of the edges between the two legs has a rounded shape.

The leg portion has at least one, preferably two, more preferably three baggage restrain bars and/or nets for restraining baggage, wherein the at least one baggage restrain bar and/or net is coupled to at least one leg, preferably to the first leg and/or the third leg, wherein the at least one baggage restrain bar and/or net is preferably configured to extend in an airplane widthwise orientation in an installed state of the leg portion, wherein the at least one baggage restrain bar is preferably configured to extend substantially parallel to an airplane floor in an installed state of the leg portion and wherein the at least one baggage restrain net is preferably configured to extend under an angle to an airplane floor in an installed state of the leg portion.

The leg portion has at least one, preferably two, more preferably three baggage restrain bars and/or nets for restraining baggage, wherein a first baggage restrain bar and/or net is coupled to at least one leg and at least one leg of another leg portion, wherein preferably a second baggage restrain bar and/or net is coupled to at least one leg of the leg portion and extending opposite to the first baggage restrain bar and/or net and wherein preferably a third baggage restrain bar and/or net is coupled to at least one leg of the other leg portion and extending opposite to the first baggage restrain bar and/or net.

The leg portion has at least one, preferably two, more preferably three baggage restrain bars and/or nets for restraining baggage, wherein the at least one baggage restrain bar and/or net is coupled to the two symmetrical halves of the respective leg.

The leg portion has at least one, preferably two, more preferably three footrests, wherein the at least one footrest is coupled to at least one leg, preferably to the second leg and/or the fourth leg, wherein the at least one footrest is preferably configured to extend in an airplane widthwise orientation in an installed state of the leg portion, wherein the at least one footrest is preferably configured to extend substantially parallel to an airplane floor in an installed state of the leg portion and wherein the at least one footrest is preferably configured to be operated by a rearward passenger in an installed state of the leg portion.

The leg portion has at least one, preferably two, more preferably three footrests, wherein the at least one footrest is coupled to the two symmetrical halves of the at least one leg.

At least one of the above features allows an optimization of a weight vs. stability ratio of the leg portion and/or a particularly strong connection to the adjacent frame portion and/or allows the seat assembly to be operated with high security and sufficient comfort.

A fourth aspect of the invention relates to a supporting portion for a lightweight aircraft passenger seat assembly, preferably in combination with at least one of the preceding aspects of the invention, wherein the supporting portion comprises at least one leg portion which satisfies at least one of the following features:

The leg portion is made from fiber reinforced composite material, preferably a laminated fiber reinforced composite material.

The leg portion has at least one leg, preferably two or more legs, more preferably four legs, wherein at least a portion of at least one fiber layer has a fiber orientation extending in length orientation of the respective leg, including a tolerance of +/−15°, preferably +/−5°, more preferably +/−2°.

The leg portion has at least one leg, preferably two or more legs, more preferably four legs, wherein at least a portion of at least one fiber layer has a fiber orientation extending perpendicular to the length orientation of the respective leg, including a tolerance of +/−15°, preferably +/−5°, more preferably +/−2°.

The leg portion has at least one leg, preferably two or more legs, more preferably four legs, wherein at least a portion of at least one fiber layer has a fiber orientation which is arranged under an angle of 45° to the length orientation of the respective leg, including a tolerance of +/−15°, preferably +/−5°, more preferably +/−2°.

The leg portion has at least two legs, preferably three legs, more preferably four legs, wherein at least a portion of at least one fiber layer extends over at least two legs free of intersections and wherein preferably at least one fiber layer entirely covers four legs free of intersections.

The leg portion has at least two legs which are connected to extend along a continuous line, preferably along a straight line, and preferably extend between a front frame-side connecting portion and a rear aircraft-side coupling portion, wherein at least one fiber layer continuously extends along the two legs free of intersections.

The leg portion has at least two legs which are connected to extend along a continuous line, preferably along a straight line, and preferably extend between a front frame-side connecting portion and a rear aircraft-side coupling portion, wherein at least one fiber layer has a fiber orientation extending along the continuous line of the two legs, including a tolerance of +/−15°, preferably +/−5°, more preferably +/−2°.

The leg portion has at least two legs which are connected to extend along a continuous line, preferably along a straight line, and preferably extend between a front frame-side connecting portion and a rear aircraft-side coupling portion, wherein at least one fiber layer has a fiber orientation extending perpendicular to the continuous line of the two legs, including a tolerance of +/−15°, preferably +/−5°, more preferably +/−2°.

The leg portion has at least two legs which are connected to extend along a continuous line, preferably along a straight line, and preferably extend between a front frame-side connecting portion and a rear aircraft-side coupling portion, wherein at least one fiber layer has a fiber orientation arranged under an angle of 45° relative to the continuous line of the two legs, including a tolerance of +/−15°, preferably +/−5°, more preferably +/−2°.

The leg portion has at least two legs, preferably three legs, more preferably four legs, wherein at least one fiber layer extending along the legs has portions with different fiber orientations abutting along a butt-join, wherein each layer portion is free of intersections and wherein each layer portion extends at least over a portion of a leg and wherein preferably the butt-join extends along a transition region or adjacent to a transition region between two legs.

The leg portion has at least two legs, preferably three legs, more preferably four legs, wherein at least one fiber layer extending along the legs has portions with different fiber orientations abutting along a butt-join, wherein each layer portion is free of intersections,
  wherein a first layer portion extends at least over a portion of a first leg and over a portion of a third leg, wherein a third layer portion extends at least over a portion of the third leg and wherein a butt-join between the first and the third layer portion extends along the third leg, or
  wherein a first layer portion extends at least over a portion of a first leg, wherein a third layer portion extends at least over a portion of the third leg and over a portion of the first leg and wherein a butt-join between the first and the third layer portion extends along the first leg.

The leg portion has at least two legs, preferably three legs, more preferably four legs, wherein at least one fiber layer extending along the legs has portions with different fiber orientations abutting along a butt-join, wherein each layer portion is free of intersections,
  wherein a fourth layer portion extends at least over a portion of a fourth leg and over a portion of a second leg, wherein a second layer portion extends at least over a portion of the second leg and wherein a butt-join between the fourth and the second layer portion extends along the second leg, or
  wherein a fourth layer portion extends at least over a portion of a fourth leg, wherein a second layer portion extends at least over a portion of the second leg and over a portion of a fourth leg and wherein a butt-join between the fourth and the second layer portion extends along the fourth leg.

The leg portion has at least two legs, preferably three legs, more preferably four legs, wherein at least a portion of the transition region between at least two legs is reinforced by an enforcement fiber layer.

At least one of the above features allows an optimization of a weight vs. stability ratio of the leg portion and/or a particularly high stability of the leg portion in different load and/or torsion orientations and/or a high stability between different portions, particularly legs, of the leg portion, particularly in the transition region between different legs, and/or a strong connection to an adjacent frame portion.

A fifth aspect of the invention relates to a supporting portion for a lightweight aircraft passenger seat assembly, preferably in combination with at least one of the preceding aspects of the invention, wherein the supporting portion comprises at least one frame portion which satisfies at least one of the following features:

The frame portion forms an integral and/or monolithic body.

The frame portion is a one-piece construction.

The frame portion is configured to support at least one seat portion, preferably exactly three seat portions.

The frame portion defines at least one receptacle for receiving and supporting at least one seat portion or the at least one seat shell.

The frame portion is configured to connect to the at least one seat portion by positive connection and/or non-positive connection and/or adhesion bond.

The frame portion is configured to connect to the at least one seat shell, preferably to a sitting portion and/or a backrest portion and/or a headrest portion and/or an armrest portion of the at least one seat shell, by positive connection and/or non-positive connection and/or adhesion bond.

The frame portion comprises at least one male and/or female engagement feature for establishing a form-fit, preferably in an orientation perpendicular to a length orientation of the male and/or female engagement feature, and/or a non-positive connection, preferably in a length orientation of the male and/or female engagement feature, together with at least a corresponding one female and/or male engagement feature of a leg portion.

The frame portion comprises at least one leg coupling fixture, which is configured to couple the frame portion with the leg portion of the seat assembly, preferably with a frame coupling element of the leg portion.

The frame portion comprises at least one leg coupling fixture, which is bonded, preferably clinched and/or bolted with the beam portion and/or with the loop portion, preferably with the straight portion of the loop portion.

The frame portion comprises more than one leg coupling fixture, preferably four leg coupling fixtures for coupling the frame portion with the leg portion of the seat assembly, wherein preferably two leg coupling fixtures are bonded with the beam portion and two leg coupling fixtures are bonded with the loop portions, wherein preferably each of the loop portions is provided with one of the leg coupling fixtures.

The frame portion comprises more than one leg coupling fixture, preferably four leg coupling fixtures for coupling the frame portion with at least one leg portion of the seat assembly, wherein at least one leg coupling fixture is configured to be coupled to a frame coupling element of the leg portion which is inserted in the recess of a third leg and/or wherein at least one leg coupling fixture is configured to be coupled to a frame coupling element of the leg portion which is inserted in the recess of a fourth leg.

The frame portion comprises at least one leg coupling fixture, which is configured to couple the frame portion with at least one leg portion of the seat assembly, wherein the leg coupling fixture comprises at least an inlay element and/or a cap element, wherein the inlay element is preferably configured to be inserted into the beam portion and/or the loop portion from the upper side thereof and/or wherein the cap element is preferably configured to be attached to the beam portion and/or the loop portion from the lower side thereof, wherein the cap element is preferably bonded, more preferably clinched and/or bolted to the inlay element, wherein the inlay element and the cap element preferably enclose a section of the beam portion and/or the loop portion to form a sandwich structure.

The frame portion comprises at least one leg coupling fixture with an inlay element and a cap element, wherein the cap element preferably comprises a supporting portion and at least a connecting portion, preferably two connecting portions, wherein the supporting portion is configured to support the cap element relative to the beam portion and/or the loop portion and/or wherein the supporting portion preferably has a shape being complementary to an exterior shape of the beam portion and/or the loop portion, so as to fit snugly therein from a lower side, wherein the at least one connecting portion preferably has a through hole for a bolt or a screw, wherein the connecting portion preferably protrudes from the supporting portion through a recess in a cover element, which is configured to cover the cap element, wherein the inlay element preferably has a shape being complementary to an interior shape of the beam portion and/or the loop portion, so as to fit snugly thereon from an upper side.

The frame portion comprises at least one leg coupling fixture which forms a rotary joint which is configured to rotate the frame portion relative to the leg portion, wherein the axis of rotation of the rotary joint is preferably substantially parallel, including a tolerance of up to 20°, to an aircraft floor, preferably parallel to the aircraft's pitch axis and/or roll axis, wherein the rotary joint preferably enables rotation of the frame portion relative to the leg structure and/or the respective leg by an angle of up to +10° and/or −10°, preferably at least +5° and/or −5° and preferably of up to +15° and/or −15°, as measured from a regular position.

The frame portion comprises at least one beam portion, which preferably extends along a curved and/or straight line, preferably in the aircraft's widthwise orientation, wherein the beam portion is preferably twistable, for example, by a twisting angle of equal or greater than +/−2° or equal or greater than +/−5° or equal or greater than +/−10°, as measured from an untwisted state and/or wherein the beam portion is preferably bendable, for example, by a bending angle of equal to or greater than +/−2° or equal to or greater than +/−5° or equal to or greater than +/−10°, as measured from an unbended state.

The frame portion comprises at least one loop portion, preferably exactly two loop portions, wherein at least one loop portion preferably forms a closed loop, wherein preferably two loop portions are arranged at opposite ends of one beam portion, wherein preferably the beam portion and straight sections of two loop portions extend along a straight line.

The frame portion comprises at least one loop portion, preferably exactly two loop portions, wherein the at least one loop portion comprises two straight portions and two connecting portions, wherein each connecting portion connects an end of a straight portion with an end of another straight portion and wherein preferably the straight portions extend parallel to each other and/or the connecting portions extend parallel to each other.

The frame portion comprises at least one beam portion extending along a curved and/or straight line and configured to be installed in the aircraft's width-wise orientation and at least two spine portions coupled to the beam portion, wherein the spine portions are configured to be moveable relative to each other and/or bendable independently from each other.

The frame portion comprises at least one spine portion, preferably exactly three spine portions, wherein preferably at least one spine portion connects to at least one beam portion and/or at least one spine portion connects to at least one loop portion, wherein at least one spine portion is preferably configured to extend upwards relative to an aircraft floor in an installed state, wherein at least one spine portion is preferably curved and/or has a furcated distal end, wherein the spine portion is preferably T-shaped and/or Y-shaped.

The frame portion provides at least one passenger safety belt attachment space, preferably a cavity or throughhole, for receiving and fixing at least one passenger safety belt fixture, wherein the passenger safety belt attachment space is preferably integrated into a loop portion and/or provided at the inside and/or provided at the outside of a loop portion.

The frame portion comprises at least one spine portion and/or a beam portion and/or at least one loop portion with at least a straight portion and at least a connecting portion, wherein the spine portion and/or the beam portion and/or the straight portion of the loop portion and/or the connecting portion of the loop portion has a base section and at least one flank section arranged at an angle to the base section, wherein the base section and the at least one flank section are connected via an edge or a rounded edge and wherein preferably the edge or rounded edge extends substantially along the length axis of the respective spine portion and/or the beam portion and/or the straight portion of the loop portion and/or the connecting portion of the loop portion, including a deviation of up to 20°, preferably up to 15°, more preferably up to 10°, more preferably up to 5°, more preferably up to 2°.

The frame portion comprises at least one spine portion and/or a beam portion and/or at least one loop portion with at least a straight portion and at least a connecting portion, wherein the spine portion and/or the beam portion and/or the straight portion of the loop portion and/or the connecting portion of the loop portion has a base section and at least a first and a second flank section each arranged at an angle to the base section, wherein the first and the second flank section are connected to the base section via edges or a rounded edges being arranged at opposite ends of the base section in an orientation perpendicular to the length axis the respective spine portion and/or the beam portion and/or the straight portion of the loop portion and/or the connecting portion of the loop portion, wherein the flank sections are preferably angled to the same side of the respective base section.

The frame portion comprises at least one spine portion and/or a beam portion and/or at least one loop portion with at least a straight portion and at least a connecting portion, wherein the spine portion and/or the beam portion and/or the straight portion of the loop portion and/or the connecting portion of the loop portion has a cross-section perpendicular to its length axis having the shape of on open profile.

The frame portion is at least sectionwise covered with a closing panel, wherein the closing panel is preferably bonded, more preferably welded to the frame portion.

The frame portion and the closing panel together form a cross-section with the shape of a closed profile, wherein said cross-section is perpendicular to the length axis of the respective section of the frame portion.

The frame portion is covered with a closing panel at least in the area of a beam portion and/or in the area of a loop portion with at least a straight portion and at least a connecting portion, wherein the frame portion is preferably free of covering elements in the area of the spine portion.

The frame portion has at least one, preferably two, more preferably three baggage restrains bar and/or nets for restraining baggage, wherein the at least one baggage restrain bar and/or net is coupled to at least one loop portion, preferably to two loop portions, wherein at least a portion of the baggage restrain bar and/or net is preferably configured to extend in an airplane widthwise orientation in an installed state of the frame portion, wherein at least a portion of the bag-gage restrain bar is preferably configured to extend substantially parallel to an airplane floor in an installed state of the frame portion and wherein the bag-gage restrain net is preferably configured to extend under an angle, preferably perpendicular, to an airplane floor in an installed state of the frame portion.

The frame portion has at least one, preferably two, more preferably three footrests, wherein the at least one footrest is coupled to the beam portion and/or at least one loop portion, wherein the at least one footrest is preferably configured to extend in an airplane widthwise orientation in an installed state of the frame portion, wherein the at least one footrest is preferably configured to extend substantially parallel to an airplane floor in an installed state of the frame portion and wherein the at least one footrest is preferably configured to be operated by a rearward passenger in an installed state of the frame portion.

At least one of the above features allows an optimization of a weight vs. stability ratio of the frame portion and/or a particularly strong connection to the adjacent leg portions and/or seat portions and/or allows the seat assembly to be operated with high security and sufficient comfort. In particular, the design of the frame portion with two loop portions arranged at opposite ends of one beam portion forms a twistable torsion box and significantly benefits the passing of the dynamic tests prescribed by SAE AS 8049B-2005.

A sixth aspect of the invention relates to a supporting portion for a lightweight aircraft passenger seat assembly, preferably in combination with at least one of the preceding aspects of the invention, wherein the supporting portion comprises at least one frame portion which satisfies at least one of the following features:

The frame portion is at least partially, preferably entirely, made from fiber reinforced composite material, preferably a laminated fiber reinforced composite material.

The frame portion has at least one fiber layer with a fiber orientation in length orientation of at least one spine portion, including a tolerance of +/−15°, preferably +/−5°, more preferably +/−2°.

The frame portion has at least one fiber layer with a fiber orientation perpendicular to the length orientation of at least one spine portion, including a tolerance of +/−15°, preferably +/−5°, more preferably +/−2°.

The frame portion has at least one fiber layer with a fiber orientation which is arranged under an angle of 45° to the length orientation of at least one spine portion, including a tolerance of +/−15°, preferably +/−5°, more preferably +/−2°.

The frame portion has at least one fiber layer with a fiber orientation in length orientation of the beam portion and/or at least one straight portion of at least one loop portion and/or at least one connecting portion of at least one loop portion, including a tolerance of +/−15°, preferably +/−5°, more preferably +/−2°.

The frame portion has at least one fiber layer with a fiber orientation perpendicular to the length orientation of the beam portion and/or at least one straight portion of at least on loop portion and/or at least one connecting portion of at least one loop portion, including a tolerance of +/−15°, preferably +/−5°, more preferably +/−2°.

The frame portion has at least one fiber layer with a fiber orientation which is arranged under an angle of 45° to the length orientation of the beam portion and/or at least one straight portion of at least on loop portion and/or at least one connecting portion of at least one loop portion, including a tolerance of +/−15°, preferably +/−5°, more preferably +/−2°.

The frame portion has at least one primary fiber layer with cut-outs in the region of the male and/or female engagement features and/or at least one enforcement fiber layer in the region of the male and/or female engagement features.

The frame portion has at least one primary fiber layer with cut-outs in a seat belt attachment region and/or at least one enforcement fiber layer in the seat belt attachment region.

The frame portion has at least two, preferably a plurality of, enforcement fiber layers in the region of the male and/or female engagement features and/or in the seat belt attachment region, wherein preferably at least one primary fiber layer is arranged between the at least two enforcement fiber layers and wherein preferably a subsequent enforcement fiber layer covers a smaller area than the previous enforcement fiber layer.

The frame portion has at least one continuous fiber layer, preferably a plurality of continuous fiber layers, covering at least a portion of the beam portion and adjacent portions of the respective spine portion, wherein preferably a subsequent fiber layer covers the same or a smaller area than the previous fiber layer and wherein preferably a subsequent fiber layer has a fiber orientation perpendicular to the previous fiber layer.

The frame portion has at least one continuous fiber layer, preferably a plurality of continuous fiber layers, covering at least a portion of the beam portion, at least a portion of the loop portions and at least a portion of the spine portions, wherein preferably a subsequent fiber layer covers the same or a smaller or a larger area than the previous fiber layer.

The frame portion has at least one fiber layer extending along portions of the beam portion, portions of the at least one loop portion and portions of the at least one spine portion, wherein the fiber layer has continuous portions with different fiber orientations abutting along a butt-join and wherein each continuous layer portion is free of intersections, wherein a first layer portion extends at least along portions of the beam portion and/or along portions of the loop portion, wherein a second layer portion extends at least along portions of the spine portion and wherein a butt-join between the first and the second layer portion extends along a transition region or adjacent to a transition region between the at least one spine portion and the beam portion or the respective loop portion.

The frame portion has at least one fiber layer extending along portions of the at least one loop portion, wherein the fiber layer has continuous portions with different fiber orientations abutting along a butt-join and wherein each continuous layer portion is free of intersections, wherein a first layer portion extends at least along a base section of the respective loop portion, wherein a second layer portion extends at least along a flank section of the respective loop portion and wherein a butt-join between the first and the second layer portion extends along an edge or rounded edge between the base section and the flank section.

At least one of the above features allows an optimization of a weight vs. stability ratio of the frame portion and/or a particularly high stability of the frame portion in different load and/or torsion orientations and/or a high stability between different portions of the frame portion, particularly in the transition region between the spine portions and the beam portion and/or the loop portions, and/or a strong connection to an adjacent leg portion and/or seat portion.

A seventh aspect of the invention relates to a supporting portion for a lightweight aircraft passenger seat assembly, preferably in combination with any one of the preceding aspects of the invention, wherein the supporting portion comprises at least one leg portion and at least one frame portion, wherein the leg portion is coupled to the frame portion via at least one rotary joint. The rotary joint preferably satisfies at least one of the following features:

- The rotary joint comprises at least a frame coupling element of the leg portion and/or a leg coupling fixture of the frame portion and/or a link member, which is configured to couple the frame coupling element and the leg coupling fixture, wherein preferably at least one of the frame coupling element, the leg coupling fixture or the link member is made from a metal material.
- The rotary joint comprises at least one link member, which is formed by a screw or a bolt, wherein the link member is preferably inserted into the through hole of at least one of the frame coupling element and the leg coupling fixture, wherein the link member is preferably inserted in the through hole of one of the frame coupling elements and in two through holes of the leg coupling fixture being arranged adjacent to the respective frame coupling element, wherein the through hole of the frame coupling element is preferably arranged between the through holes of the respective leg coupling fixtures.
- The rotary joint comprises at least one nut, which is configured to be screwed onto the respective link member of the rotary joint.
- The rotary joint comprises at least a washer ring, wherein at least one washer ring is preferably arranged between the head of the link member and a connecting portion of the frame coupling element and/or a connecting portion of the leg coupling fixture and/or wherein at least one washer ring is preferably arranged between the nut and a connecting porting of the frame coupling element and/or a connecting porting of the leg coupling fixture, wherein at least one washer ring is preferably arranged between the connecting portion of the frame coupling element and the connecting portion of the leg coupling fixture.
- The rotary joint is configured to rotate the frame portion relative to the leg portion, wherein the axis of rotation of the rotary joint is preferably substantially parallel, including a tolerance of up to 20°, to an aircraft floor, preferably parallel to the aircraft's pitch axis and/or roll axis, wherein the rotary joint preferably enables rotation of the frame portion relative to the leg portion by an angle of up to +10° and/or −10°, preferably at least +5° and/or −5° and preferably of up to +15° and/or −15°, as measured from a regular position.
- The rotary joint is configured to rotate the frame portion relative to the leg portion, wherein the axis of rotation is formed by the length axis of the link member.
- The rotary joint is configured to rotate the frame portion relative to the leg portion, wherein the link member is inserted into the through holes of the frame coupling element and the leg coupling fixture in a loose tolerance fit and/or wherein the link member is preferably fastened by a nut in a loose tolerance fit to allow a rotation of the frame portion relative to the leg portion around an axis of rotation, which is preferably orthogonal to the length axis of the link member, preferably by an angle of up to +10° and/or −10°, more preferably at least +5° and/or −5° and even more preferably of up to +15° and/or −15°, as measured from a regular position.
- The rotary joint is configured to rotate the frame portion relative to the leg portion around an axis of rotation, which is orthogonal to the length axis of the link member, wherein the rotation is preferably regularly blocked by at least one blocking element and is only released upon application of an excessive force beyond a predetermined load level to the blocking element, wherein the blocking element preferably fails upon application of the excessive force, wherein the blocking element is preferably formed by a frangible washer.

At least one of the above features allows an optimization of a weight vs. stability ratio of the supporting portion and/or a production and maintenance of the supporting portion at considerably low costs. Furthermore, a rotary joint according to one of the above features provides significant stability to the supporting portion, in particular reduces the risk of material failure of the supporting portion, especially in the transition region between frame portion and leg portion, and finally significantly benefits the passing of the dynamic tests prescribed by SAE AS 8049B-2005.

An eighth aspect of the invention relates to a seat portion for a lightweight aircraft passenger seat assembly, preferably in combination with any one of the preceding aspects of the invention, wherein the seat portion comprises a seat shell and satisfies at least one of the following features:

- The seat shell forms an integral and/or monolithic body.
- The seat shell is a one-piece construction.
- The seat shell has a concave shape.
- The seat shell comprises a sitting portion.
- The seat shell comprises a backrest portion, wherein the backrest portion preferably rigidly connects to the sitting portion, wherein preferably the backrest portion is linear-elastically bendable relative to the sitting portion.
- The seat shell comprises a backrest portion, wherein the backrest portion and the sitting portion are connected via a continuous material portion, wherein the continuous material portion preferably forms at least a portion of the backrest portion and a portion of the sitting portion.
- The seat shell comprises a backrest portion, wherein the backrest portion and the sitting portion are connected to each other hinge-free.
- The seat shell comprises a backrest portion, wherein the backrest portion is coupled to the sitting portion via the frame portion, wherein preferably the sitting portion and the backrest portion are disconnected from each other.

The seat shell comprises a headrest portion, wherein the headrest portion preferably rigidly connects to the backrest portion.

The seat shell comprises at least one armrest portion, preferably exactly two armrest portions, wherein the armrest portion preferably rigidly connects to the sitting portion and/or to the backrest portion, wherein the armrest portion preferably protrudes from the backrest portion toward the side of the sitting portion and/or protrudes from the sitting portion toward the side of the backrest portion.

The seat shell is configured to connect to a frame portion of the supporting portion, wherein preferably the backrest portion is bonded, preferably via at least one bonding portion of the backrest portion, to the spine portion of the frame portion, for example in at least one position including the position of the furcated ends of the spine portion and/or a position of the spine portion between its proximal end and the furcated ends, and/or wherein the sitting portion rests on the beam portion and/or on the loop portion of the frame portion, wherein preferably the sitting portion can slide on the beam portion and/or the loop portion of the frame portion in a guided fashion, preferably so as to be held by friction in individual positions, or wherein the sitting portion is connected, particularly fixedly attached, to the beam portion and/or to the loop portion of the frame portion.

The seat shell has at least one bonding portion arranged on the backrest portion, wherein the bonding portion is configured as a shaped element, configured to engage a corresponding shaped element arranged on at least one spine portion for providing a form-fit between the backrest portion and the respective spine portion in a length orientation of the spine portion and/or the backrest portion.

The seat portion comprises at least one cushioning pad attached to the sitting portion and/or the backrest portion and/or the headrest portion and/or the armrest portion, wherein the at least one cushioning pad is preferably bonded and/or attached via a Velcro strip to the sitting portion and/or the backrest portion and/or the headrest portion and/or the armrest portion.

The seat portion is identical to at least another seat portion.

The seat portion and/or the seat shell is configured to be separately attached to the supporting portion.

The seat portion and/or the seat shell is disconnected from an adjacent seat portion and/or seat shell of the lightweight aircraft passenger seat assembly, preferably two adjacent backrest portions are disconnected from each other.

At least one of the above features allows an optimization of a weight vs. stability ratio of the seat portion and/or a production and maintenance of the seat portion at considerably low costs. Furthermore, an integrated design according to one of the above features provides significant rigidity to the seat shell and significantly benefits the passing of the dynamic tests prescribed by SAE AS 8049B-2005.

A ninth aspect of the invention relates to a seat portion for a lightweight aircraft passenger seat assembly, preferably in combination with at least one of the preceding aspects of the invention, wherein the seat portion comprises a seat shell and satisfies at least one of the following features:

The seat shell is at least partially, preferably entirely, made from a plastic material, preferably formed by an injection moulding.

The seat shell is at least partially, preferably entirely, made from fiber rein-forced composite material, preferably a laminated fiber reinforced composite material.

The seat shell is an integral composite sandwich construction.

The seat shell comprises a first fiber layer, a second fiber layer and a core material between the first fiber layer and the second fiber layer, preferably a foam core material or a closed cell foam core material in particular, and preferably a rigid reinforcement member between the first fiber layer and the second fiber layer, wherein the first and the second fiber layer are preferably made from the enforcement fiber layer material.

The seat shell comprises a first fiber layer, a second fiber layer and a core material between the first fiber layer and the second fiber layer, wherein the core material extends along portions of the sitting portion and/or along portions of the backrest portion and wherein preferably the transition region between the back-rest portion and the sitting portion is free of the core material.

The seat shell comprises a first fiber layer and a second fiber layer, wherein the first fiber layer is arranged on the passenger side of the seat shell and the second fiber layer is arranged on the side of the seat shell averted from the passenger side of the seat shell, wherein preferably the second fiber layer is intersected in the transition region or adjacent to the transition region between the sitting portion and the backrest portion of the seat shell and wherein preferably the first fiber layer extends along the sitting portion and the backrest portion free of intersections.

The seat shell comprises at least one fiber layer with a fiber orientation in the length orientation of the seat shell, preferably in the length orientation of the sitting portion and/or in the length orientation of the backrest portion, including a tolerance of up to +/−60°, preferably of up to +/−45°, more preferably of up to +/−30 and more preferably of up to +/−15°.

The seat shell comprises at least one armrest portion comprising at least one fiber layer, preferably a plurality of fiber layers, with a fiber orientation in length orientation of the armrest portion, including a tolerance of up to +/−60°, preferably of up to +/−45°, more preferably of up to +/−30 and more preferably of up to +/−15°, wherein preferably a plurality of fiber layers of the armrest portion have the same fiber orientation, including a tolerance of up to +/−15°, preferably of up to +/−10°, more preferably of up to +/−5 and more preferably of up to +/−2°, wherein the at least one fiber layer of the armrest portion is preferably a filling ply.

The seat shell comprises at least one armrest portion comprising a foam core, wherein preferably two layers subsequent to the foam core have fiber orientations which are arranged perpendicular or at an angle of +/−45° to each other.

The seat shell with at least one shaped element arranged at the backrest portion, wherein the at least one shaped element comprises a foam core portion in a corresponding shape, which foam core portion is bonded to the foam core of the backrest portion.

At least one of the above features allows an optimization of a weight vs. stability ratio of the seat portion and/or a production and maintenance of the seat portion at considerably low costs. Furthermore, an integrated design and a fiber layer composition according to one of the above features provides significant rigidity to the seat shell and significantly benefits the passing of the dynamic tests prescribed by SAE AS 8049B-2005.

A tenth aspect of the invention relates to a foot portion for a lightweight aircraft passenger seat assembly, preferably in combination with at least one of the preceding aspects of the invention, wherein the foot portion satisfies at least one of the following features:

The foot portion comprises at least one cap, which caps a part of a leg portion of the supporting portion and is preferably bonded to the leg portion, wherein the cap preferably has a complementary interior shape to an exterior shape of at least one leg of the leg portion, so as to fit snugly onto said leg, wherein the cap preferably wedges two symmetrical bodies of the leg portion together in an orientation perpendicular to the symmetry plane.

The foot portion comprises at least one floor coupling element, which is fixedly attached within a recess at the free end of at least one of the first and the second leg, wherein the at least one coupling element preferably comprises a supporting portion, which is inserted into the recess of the respective leg, and a connecting portion with a through hole for a bolt or a screw, wherein the supporting portion preferably has a complementary exterior shape to an interior shape of the at least one leg, so as to fit snugly into said leg.

The foot portion is configured to couple the supporting portion with an aircraft structure, preferably to a rail provided at an aircraft floor.

The foot portion forms a rotary joint which is configured to rotate the supporting portion relative to an aircraft structure, wherein the axis of rotation of the rotary joint is preferably substantially parallel, including a tolerance of up to 20°, to an aircraft floor, preferably parallel to the aircraft's pitch axis and/or roll axis, wherein the rotary joint preferably enables rotation of the supporting portion relative to the aircraft structure by an angle of up to +10° and/or −10°, preferably at least +5° and/or −5° and preferably of up to +15° and/or −15°, as measured from a regular position.

The foot portion forms a rotary joint, wherein the rotation is preferably regularly blocked by at least one blocking element and is only released upon application of an excessive force beyond a predetermined load level to the blocking element, wherein the blocking element preferably fails upon application of the excessive force.

The foot portion forms a rotary joint, wherein a barrel nut is received in a cavity of a housing in a rotatable fashion and connected to a bolt to be secured to an aircraft structure, wherein the housing is preferably formed by a cap, wherein the rotation of the barrel nut is preferably blocked in a predetermined angular position relative to the housing by means of at least one shear plate acting as blocking element, wherein the at least one shear plate fails upon application of an excessive force beyond the predetermined load level, so as to allow the barrel nut to rotate relative to the housing.

The foot portion comprises at least one housing, wherein the housing is preferably formed by a cap with a free end on its bottom side averted from the respective leg portion and facing the airplane floor in an installed state of the foot portion, which free end comprises at least one chamfer, preferably two chamfers, configured to enable the rotation of the housing relative to the airplane floor in an installed state of the foot portion.

The foot portion is identical to at least another foot portion.

The foot portion is different to at least another foot portion.

The above features allow a safe coupling of the supporting portion with the aircraft structure by the foot portion. Most notably, the foot portion can be designed according to the above features in order to accommodate the required test condition preloads according to SAE AS 8049B-2005.

An eleventh aspect of the invention relates to a passenger safety belt fixture for a lightweight aircraft passenger seat assembly, preferably in combination with at least one of the preceding aspects of the invention, wherein the passenger safety belt fixture satisfies at least one of the following features:

The passenger safety belt fixture comprises at least one bolt for bolting the passenger safety belt to the supporting portion.

The passenger safety belt fixture comprises at least one cover for covering at least one part of the supporting portion, preferably a part of the supporting portion around or in the vicinity of a bolted joint, so as to spread loads induced from a passenger safety belt across a surface around the bolted joint.

The passenger safety belt fixture comprises at least one attachment for attaching parts of the passenger safety belt to it, wherein the attachment is preferably bolted by the at least one bolt to the at least one cover.

At least one of the above features enables a secure coupling of a passenger safety belt directly to the supporting portion of the inventive lightweight aircraft passenger seat assembly, which is made from a fiber reinforced composite material.

Further to the aspects described above, the inventive seat assembly or its inventive components may comprise features for enhancing the comfort of the seat assembly or its components.

These features include, for example, pockets for magazines, newspapers, information documents or the like, wherein the pockets may be arranged at the rearward sides of the backrest portions or the rearward side of the spine portions. The pockets may be configured to be resiliently swung open or pulled open and configured to close in a self-acting manner. Also, fixtures for hanging up clothes, such as coat hooks or the like, may be provided at the rearward sides of the backrest portions or the rearward side of the spine portions. Hinged tables and/or cup holders may be provided at the rearward sides of the backrest portions or the rearward side of the spine portions or the rearward sides of the beam portions and/or the loop portions, facilitating the consumption of food and beverages by the respective rearward passenger. The cup holders may be hinged or fixedly attached to the seat portion or the frame portion and/or integrated in the respective table. The table and/or the cup holder may also be arranged inside an armrest, especially in case the respective seat assembly is configured to be positioned in the first passenger line of the respective aircraft. Thereby, the table and/or cup holder may be configured to be folded out of and folded back into the armrest. Furthermore, the armrests and also the headrests may be removable and/or arranged in a swivelling manner, which enhances the comfort of an inventive seat assembly, too.

Finally, the seat portion may be configured to be adjusted relative to the supporting portion in order to provide different sitting positions for the aircraft passenger. For example, the seat portion may be configured to swivel relative to the supporting portion.

Moreover, the inventive seat assembly or its inventive components may be equipped with entertainment features. In particular, the seat assembly may comprise electrical connectors, such as female connectors for head-phones, mobile phones, handhelds, computers or the like, which may be arranged at any component of the seat assembly, particularly at the rearward side of the seat portion or the rearward side of the frame portion and/or the armrest portion of the respective seat portion. The seat assembly may also comprise monitors or displays arranged at said positions, which monitors or displays may be connected or connectable to an electronic entertainment device or a personal computer or the like.

A twelfth aspect of the invention relates to a method for producing a lightweight component for a lightweight aircraft passenger seat assembly, preferably for a lightweight component according to any one of the preceding aspects of the invention, wherein the method comprises at least one of the following steps:

Providing a prepreg, preferably comprising a matrix of a thermoplastic composite and fibers, preferably carbon fibers, wherein said prepreg preferably satisfies at least one of the features of the lightweight component according to the second aspect of the present invention.

Heating a prepreg, preferably via an infrared heater and/or via an UV lamp.

Transporting said prepreg, preferably between a heating device and a forming device.

Forming said prepreg, preferably press forming said prepreg, more preferably press forming with matching metal moulds or moulds consisting of a metal and a rubber part or with a fluid bladder on one side, wherein the molds are preferably heated.

Removing said press formed prepreg from a forming device, preferably while the press formed prepreg is hot.

Cooling said prepreg, preferably said press formed prepreg.

Machining said press formed and/or cooled prepreg, preferably CNC machining of said press formed and/or cooled prepreg.

At least one of the above method steps enables efficient and reliable production of a lightweight component for a lightweight aircraft passenger seat assembly, which may in particular be conducted with comparably low costs.

Other embodiments of the invention result from combinations of the features disclosed in the claims, the specification and the drawings.

BRIEF DESCRIPTION OF THE DRAWINGS

FIGS. 1-7 are views of the lightweight aircraft passenger seat assembly according to the present invention, showing two leg portions, one frame portion and three seat portions, wherein FIG. 1 is a perspective front view; FIG. 2 is a perspective rear view; FIG. 3 is a front view; FIG. 4 is a rear view; FIG. 5 is a side view; FIG. 6 is a top view and FIG. 7 is a bottom view of the seating arrangement according to the present invention in an assembled state.

DETAILED DESCRIPTION OF THE PREFERRED EMBODIMENT

Figure 1:
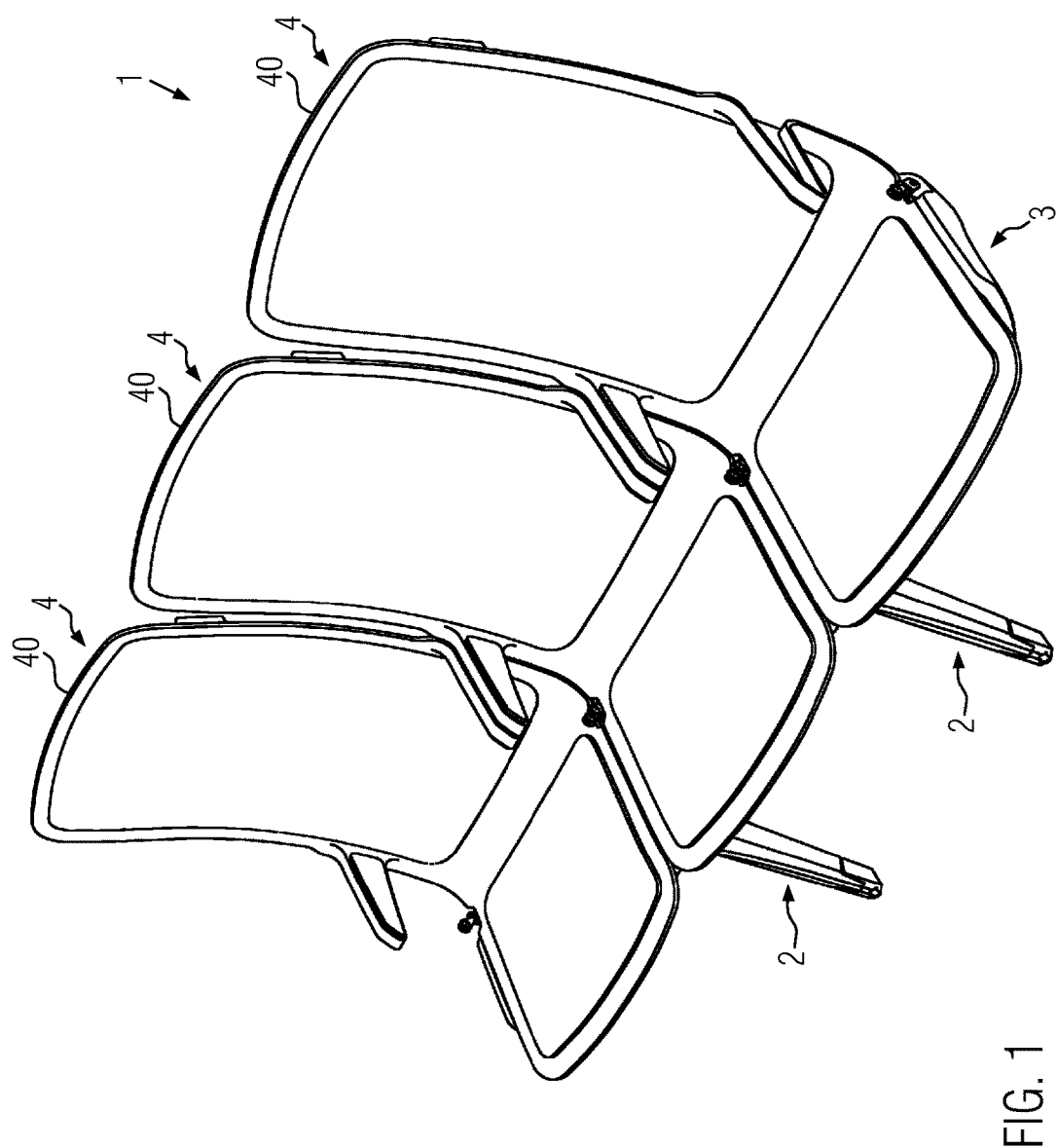
Figure 2:
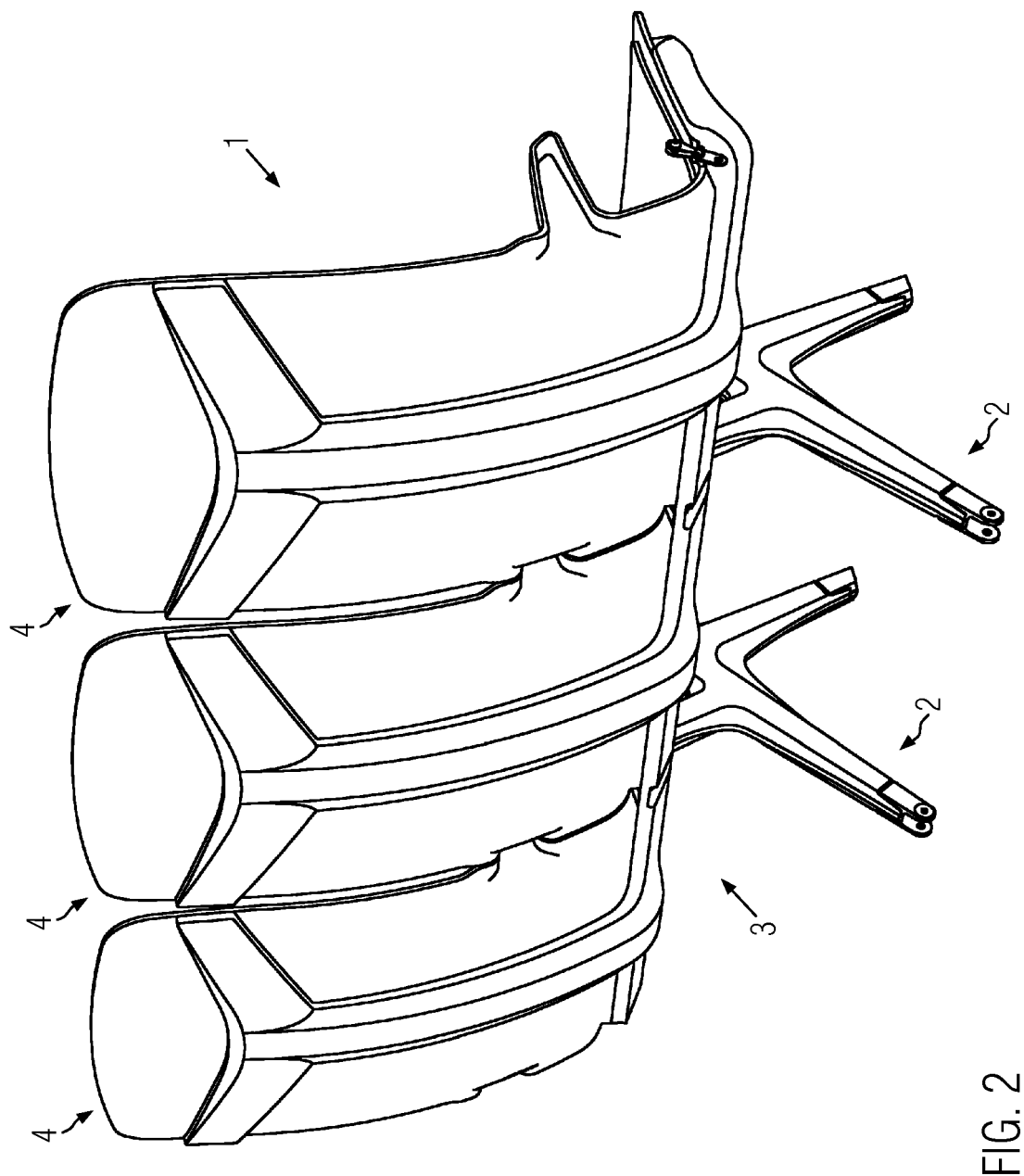
Figure 3:
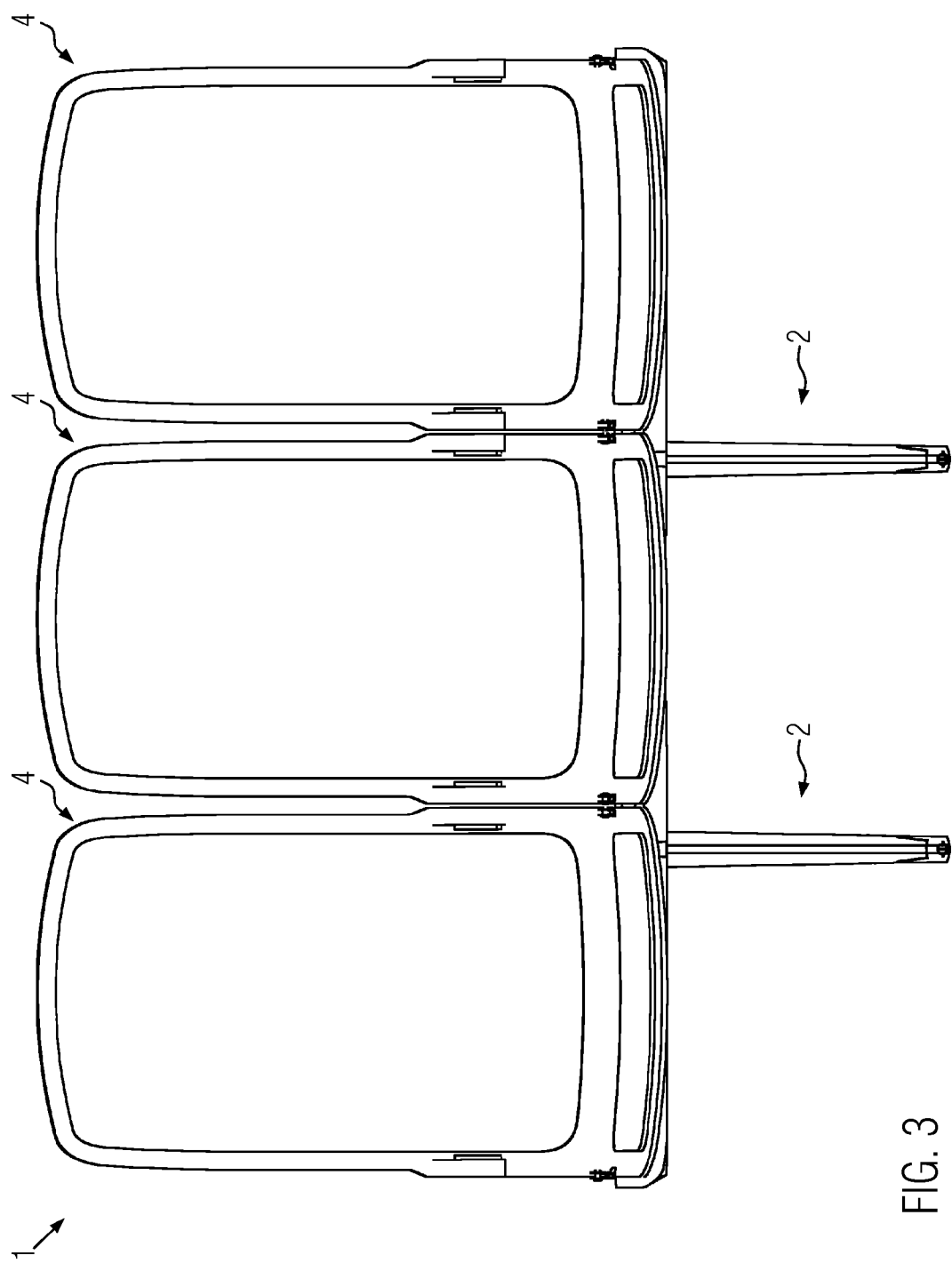
Figure 4:
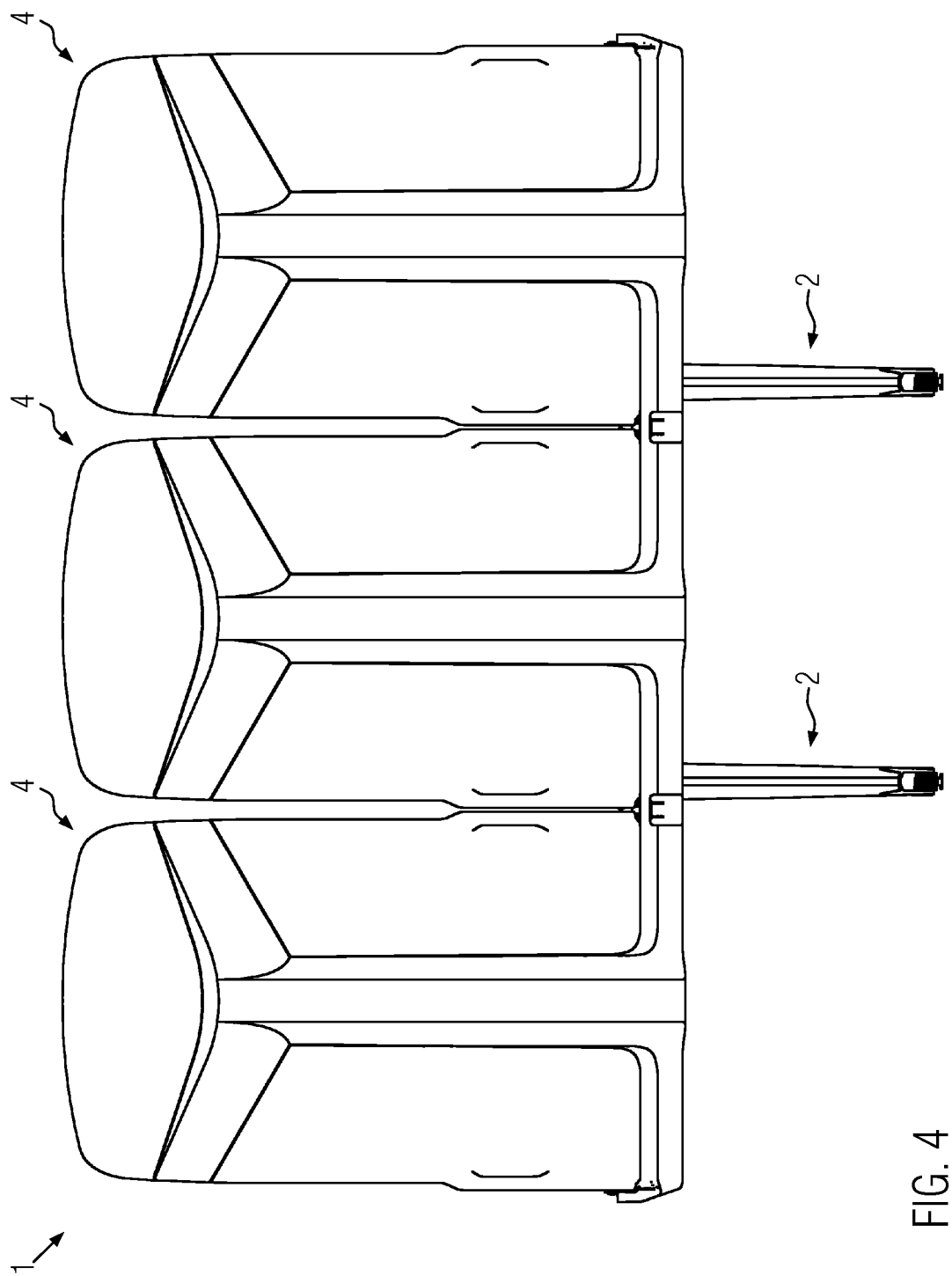
Figure 5:
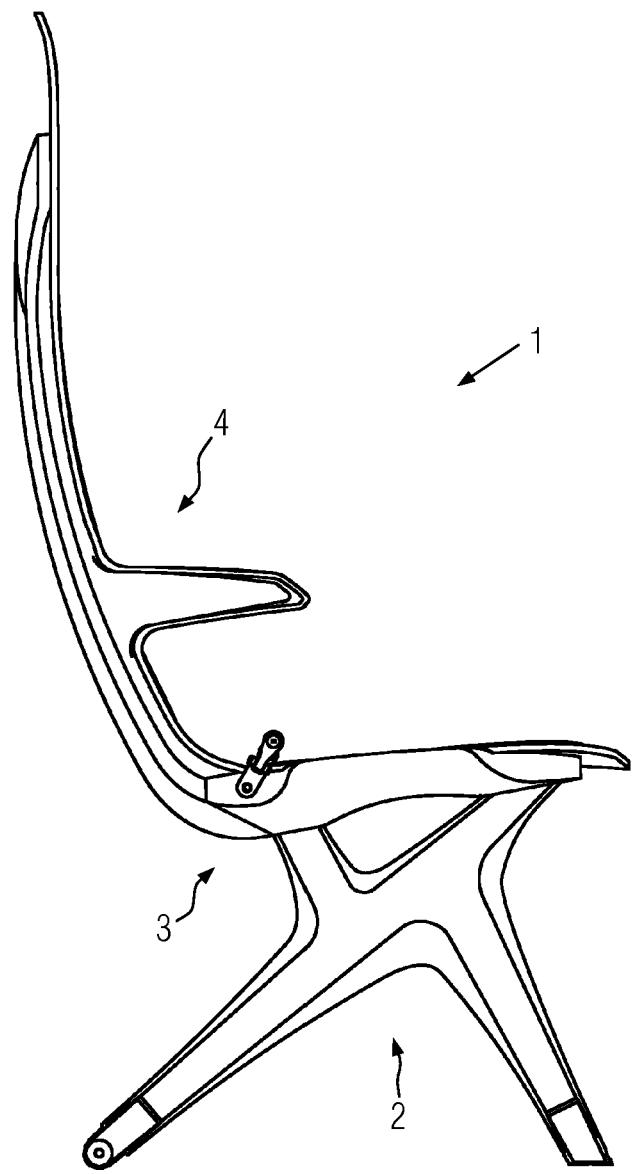
Figure 6:
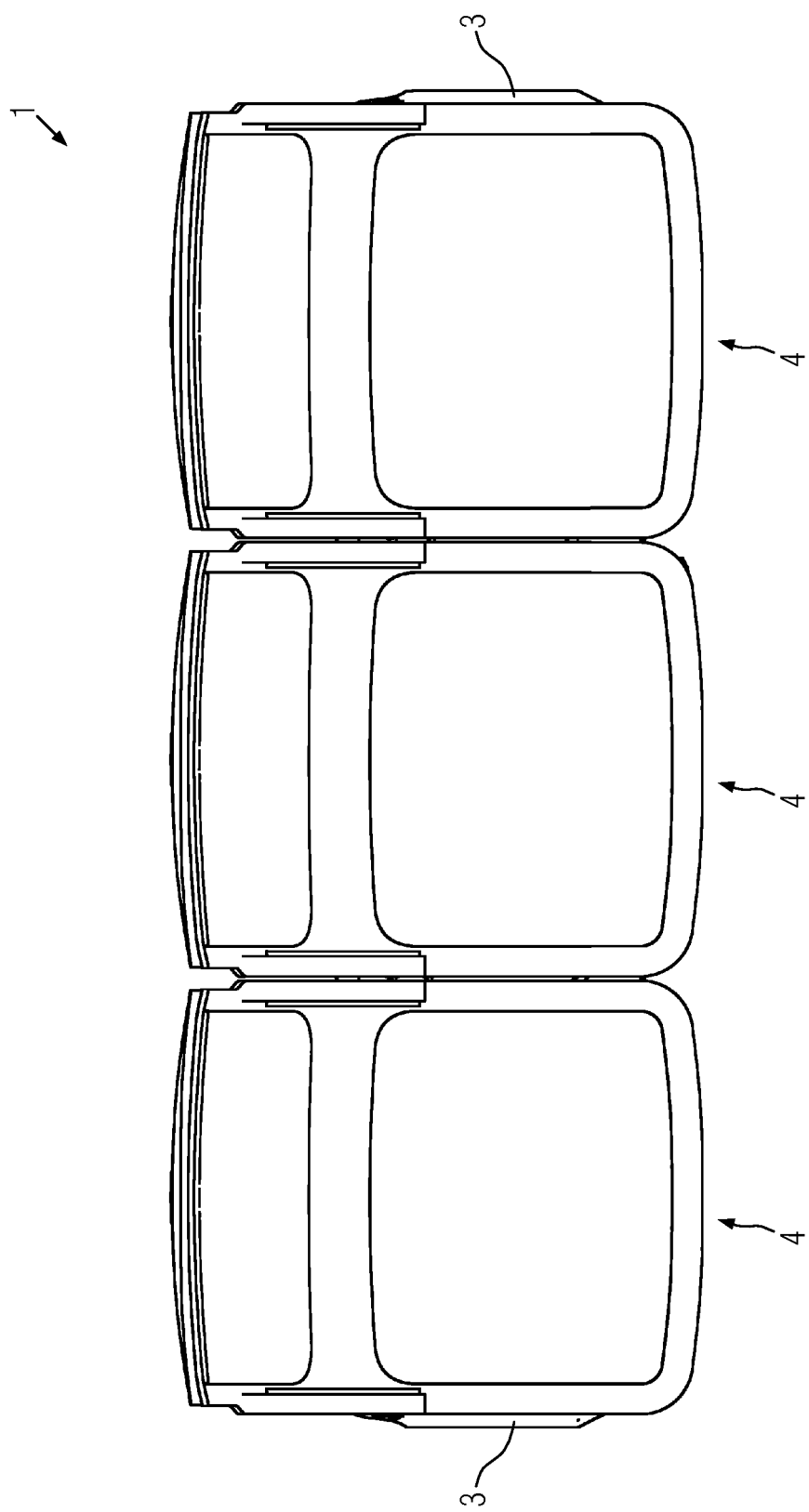
Figure 7:
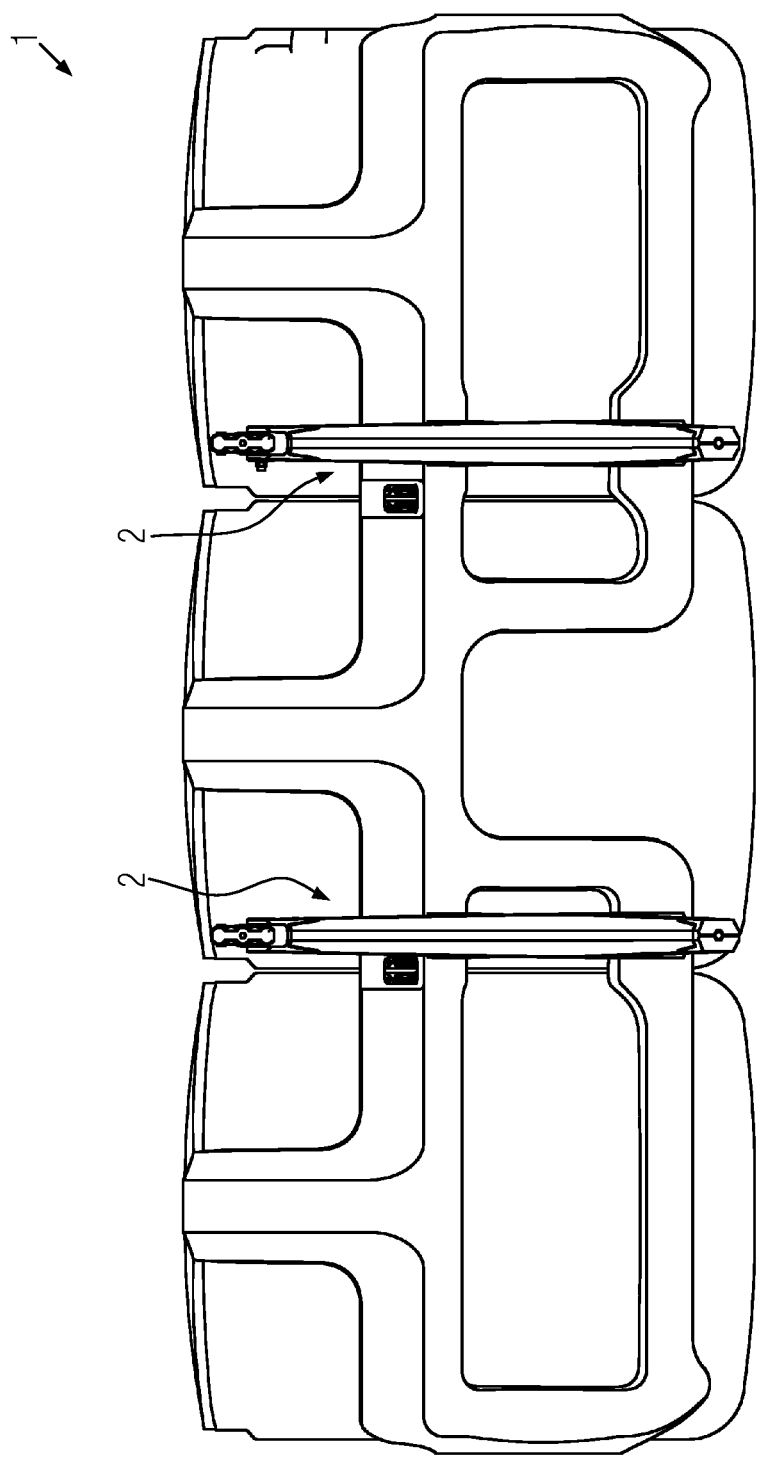
Figure 8:
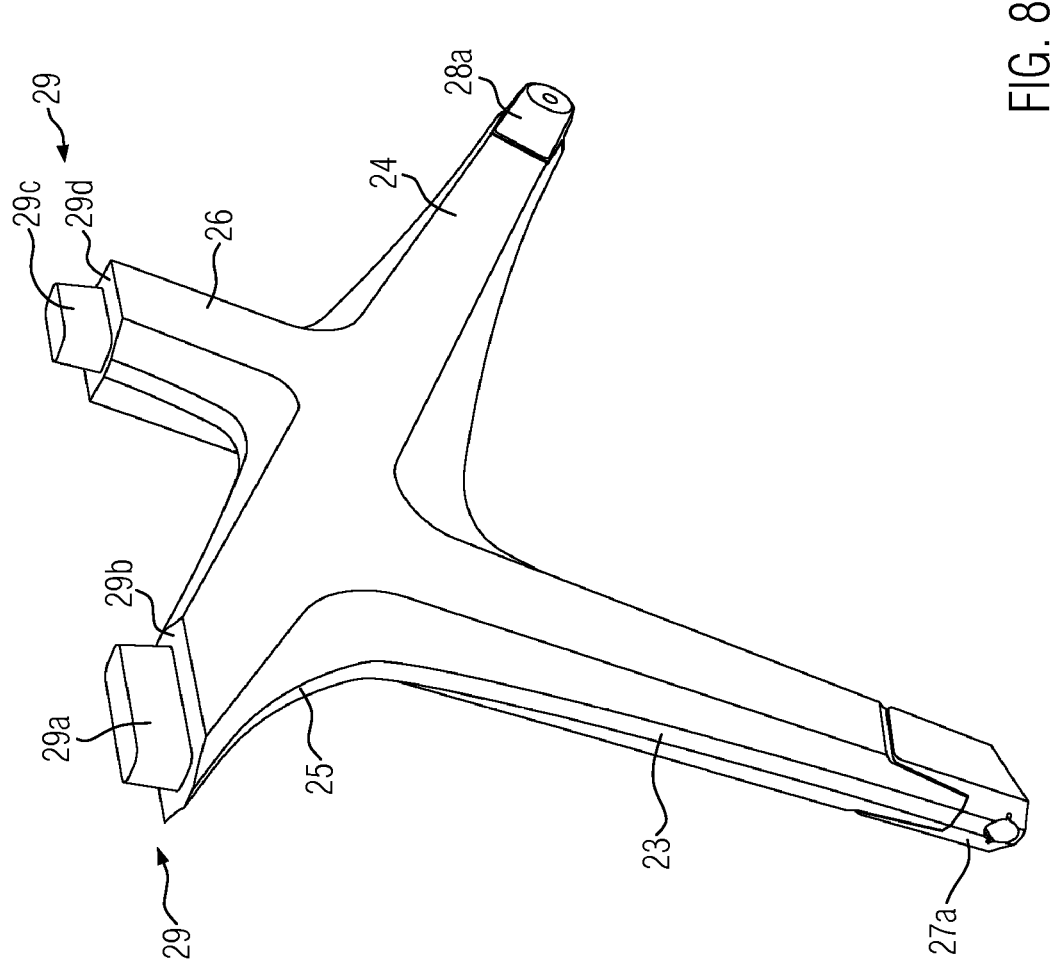
FIG. 8 is a perspective view of a leg portion of the lightweight aircraft passenger seat assembly according to the present invention combined with parts of the front and rear foot portions, respectively.
Figure 9:
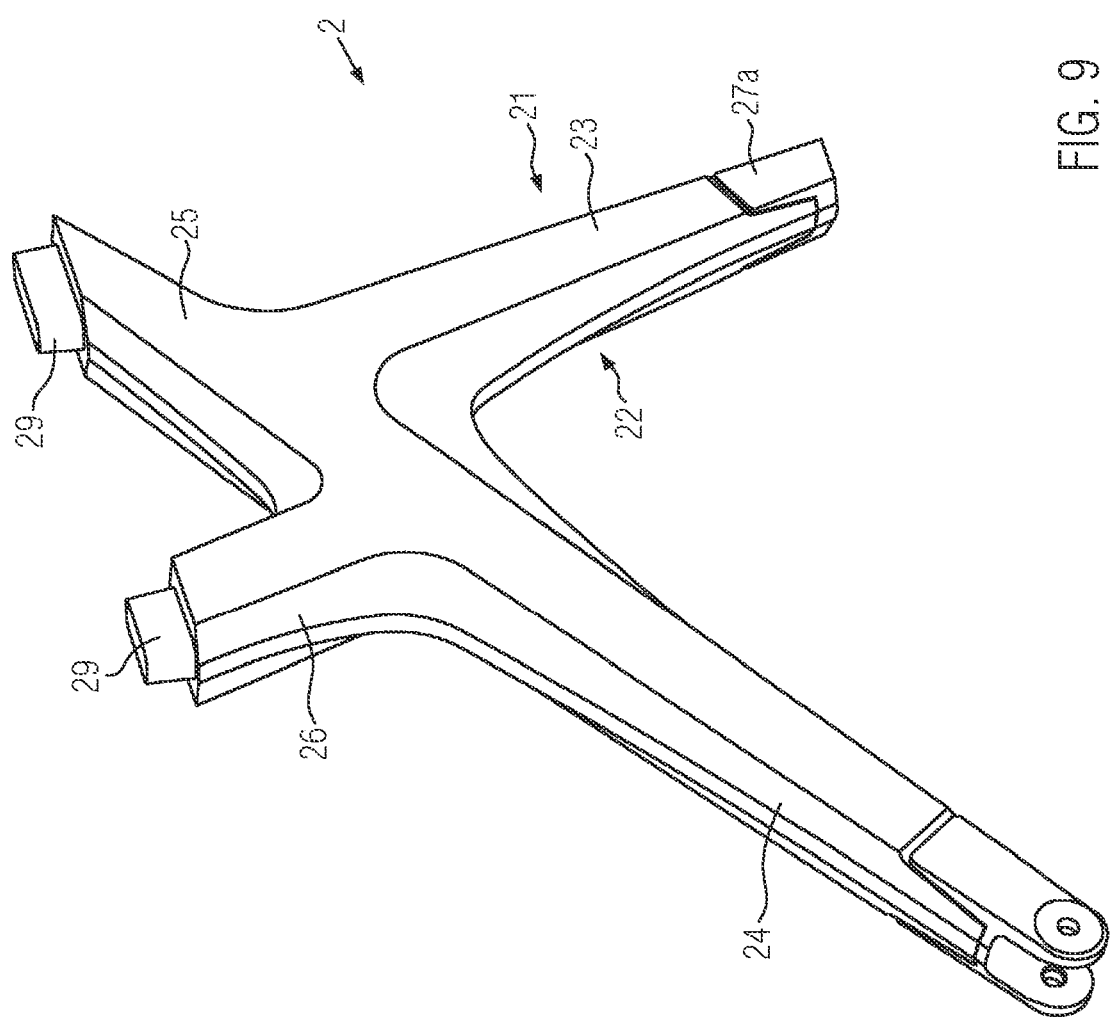
FIG. 9 is another perspective view of the leg portion of FIG. 8.
Figure 10:
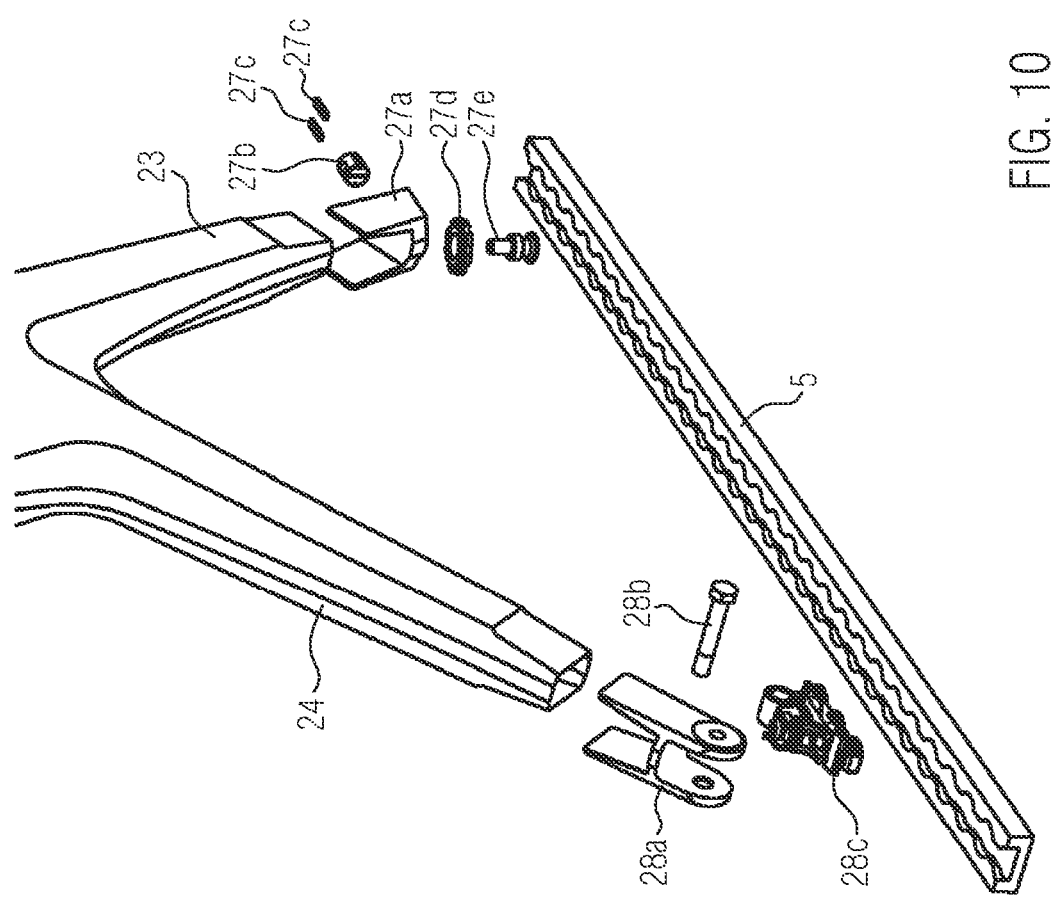
FIG. 10 is a partial perspective exploded view of the leg portion of FIG. 8, combined with other parts of the front and rear foot portions, respectively, and the corresponding rail.

The preferred embodiment of the claimed invention provides a lightweight aircraft passenger seat assembly 1, comprising three seat portions 4, each one having seat shell 40 for an aircraft passenger, and a supporting portion 2, 3 for supporting the three seat portions 4 relative to an aircraft structure. Although seat assembly 1 is depicted as a triple seat assembly, the invention can be extended to any practical seat configuration, such as a double seat, a quad seat, a single seat, or a seat configured to accommodate any number of passengers. As will be described in the following, the supporting portion 2, 3 and the three seat shells 40 are constructed as lightweight components using a fiber reinforced composite material. The supporting portion 2, 3 of the preferred embodiment contains two leg portions 2 and one frame portion 3. Hence, the lightweight aircraft passenger seat assembly 1 is constructed of three primary components, namely the leg portions 2, the frame portion 3 and the seat portions 4. The two leg portions 2 and the three seat shells 40 will be bonded to the one frame portion 3 so as to form an integrated monolithic structure.

The primary and secondary lightweight components of the lightweight aircraft passenger seat assembly 1 will be discussed in the following:

The supporting portion 2, 3 of the preferred embodiment comprises two identical leg portions 2 with four legs 23, 24; 25, 26 each, wherein each leg 23, 24; 25, 26 is hollow and comprises one opening at a tapered distal end thereof. Each leg portion 2 is composed of two symmetrical halves 21, 22 made from laminated fiber reinforced composite material, split down the center plane, which are bonded together to form an integral monolithic laminate body. Two legs 24, 25 of each leg portion 2 extend along a continuous straight line between a front frame-side connecting portion and a rear foot portion 27. The leg 23 branches-off from the leg 25 to extend downward to a front aircraft-side coupling portion, whereas the leg 26 branches-off from the leg 24 to extend upward to a rear frame-side connecting portion. The legs 23, 24 are configured to be coupled with an aircraft structure, wherein the first leg 23 is configured to be oriented forward with respect to the aircraft's longitudinal orientation and the second leg 24 is configured to be oriented rearward with respect to the aircraft's longitudinal orientation. Both legs 23, 24 are configured to be coupled with the same rail 5 installed at an aircraft floor. The third leg 25 is configured to be oriented forward with respect to the aircraft's longitudinal orientation and the fourth leg 26 is configured to be oriented rearward with respect to the aircraft's longitudinal orientation, and both legs 25, 26 are configured to be joined to the same frame portion 3. Each one of the third and fourth legs (upper legs) 25, 26 comprises one male engagement feature 29a, 29c at a distal end thereof for establishing a form-fit together with a corresponding one female engagement feature of a frame portion 3. The male engagement feature 29a, 29c is located on a flat mating surface 29b, 29d of each leg portion 2 which abuts to a flat mating surface of the frame portion 3. The leg portion 2 will be bonded to a frame portion 3 at the position of the at least one male engagement feature 29a, 29c and at the position of the at least one mating surface 29b, 29d.

In addition, the supporting portion 2, 3 of the preferred embodiment comprises one frame portion 3 which is entirely made from a laminated fiber reinforced composite material to form an integral monolithic laminated body. The frame portion 3 is configured to support three seat portions 4 and therefore defines three receptacles for receiving and supporting the three seat shells 40 of the seat portions 4. The seat shells 40 will be bonded to the frame portion 3, as will be described below. The frame portion 3 comprises one straight beam portion 31, which is configured to be oriented in the aircraft's widthwise orientation. This single beam portion 31 forms a torsion box and can be twisted by a twisting angle of e.g. equal to or greater than +/−5° from an untwisted state. Further, the two closed loop portions 32 are arranged at opposite ends of the beam portion 31, wherein the straight beam portion 31 and straight sections of two closed loop portions 32 extend along a straight line. In addition to that, the frame portion 3 comprises three spine portions 33, wherein the center spine portion 33 connects to the beam portion 31 and the outer spine portions 33 connect to the closed loop portions 32. Each one of the spine portions 33 is configured to extend upwards relative to an aircraft floor and is curved with the center of curvature being located roughly above the sitting portion 41 of the seat shell 40. Moreover, each one of the spine portions 33 has a bifurcated distal end, which is configured to encompass and/or support a backrest portion of a seat shell 40 and to define a receptacle for receiving the seat shell 40 together with the frame portion 3. Still further, the frame portion 3 provides passenger safety belt attachment spaces 34, 35 for receiving and fixing the passenger safety belt fixtures 36, 37, wherein the passenger safety belt attachment spaces 34, 35 integrated into a loop portion 32 are embodied as through-holes, and the passenger safety belt attachment spaces 34, 35 provided at the outside of the loop portions 32 are embodied as cavities.

Each one of the three identical seat shells 40 comprises a sitting portion 41, a backrest portion 42, a headrest portion as well as two armrest portions 43 arranged on both longitudinal sides of the backrest portion 42. The seat shell 40 is a one-piece composite sandwich construction and comprises a first side panel, a second side panel and a core material between the first side panel and the second side panel, and preferably a rigid reinforcement member between the first side panel and the second side panel. The core material may be a closed-cell foam. For connecting the seat shell 40 to the frame portion 3 of the supporting portion 2, 3, the backrest portion 42 will be bonded to the spine portion 33 of the frame portion 3 in three positions including the furcated ends of the spine portion 33 and a part of the spine portion 33 between its proximal end and the furcated ends. Additionally, the sitting portion 41 is configured to rest on the beam portion 31 and/or the closed loop portions 32 of the frame portion 3, so as to slide thereon in a guided fashion, wherein it can be held by friction in individual positions. For comfort, the seat portion 4 comprises cushioning pads 45, 46, 47 bonded to the sitting portion 41, the backrest portion 42 and/or the headrest portion and the armrest portions 43. The cushioning pads 45, 46, 47 can be replaced in case of wear in order to renew the appearance of the seat portion 4.

As one of the secondary components, the lightweight aircraft passenger seat assembly 1 further comprises foot portions 27, 28 for coupling the leg portions 23, 24 to a rail 5 provided at an aircraft floor. The foot portions 27, 28 are preferably made from metal and comprise a cap 27a, 28a bonded to the leg portion 2 for capping a part of a leg 23, 24 having a complementary exterior shape. Accordingly, the caps 27a, 28a fit snugly onto the legs 23, 24 and wedge the two symmetrical halves 21, 22 of the leg portion 2 together in an orientation perpendicular to the symmetry plane. Each one of the foot portions 27, 28 forms a rotary joint which is configured to rotate the supporting portion 2, 3 relative to the aircraft structure, wherein the axis of rotation of the rotary joint is roughly parallel to an aircraft floor. The two forward foot portions 27 of the two leg portions 2 are identical to each other and the two rearward foot portions 28 of the two leg portions 2 are identical to each other as well. However, the forward foot portion 27 is different from the rearward foot portion 28 of the same leg portion 2. The axis of rotation of the rotary joints formed by the forward foot portions 27 is parallel to the aircraft's roll axis. However, the rotation is regularly blocked in one angular position by at least one blocking element 27c and is only released upon application of an excessive force beyond a predetermined load level to the blocking element 27c, so that the blocking element 27c fails upon application of the excessive force. To establish this blocking, a barrel nut 27b is received in a cavity of the cap 27a in a rotatable fashion and connects to a bolt 27e to be secured to the aircraft floor rail 5. The rotation of the barrel nut 27b is blocked in the predetermined angular position relative to the cap 27a by means of two shear plates 27c acting as blocking elements 27c, wherein the two shear plates 27c are designed to fail upon application of the excessive force, so as to allow the barrel nut 27b to rotate relative to the cap 27a.

As another one of the secondary components, the lightweight aircraft passenger seat assembly 1 further comprises passenger safety belt fixtures 36, 37, each one of them comprising a bolt 36a, 37a for bolting the passenger safety belt to the supporting portion 2, 3, a cover 36b, 37b for covering a part of the supporting portion 2, 3 around the bolted joint, so as to spread loads induced from the passenger safety belt across a surface around the bolted joint, and one or more attachments 36c, 37c for attaching parts of the passenger safety belt to it. The attachments 36c, 37c will be bolted by a bolt 36a, 37a to a cover 36b, 37b.

Figure 11:
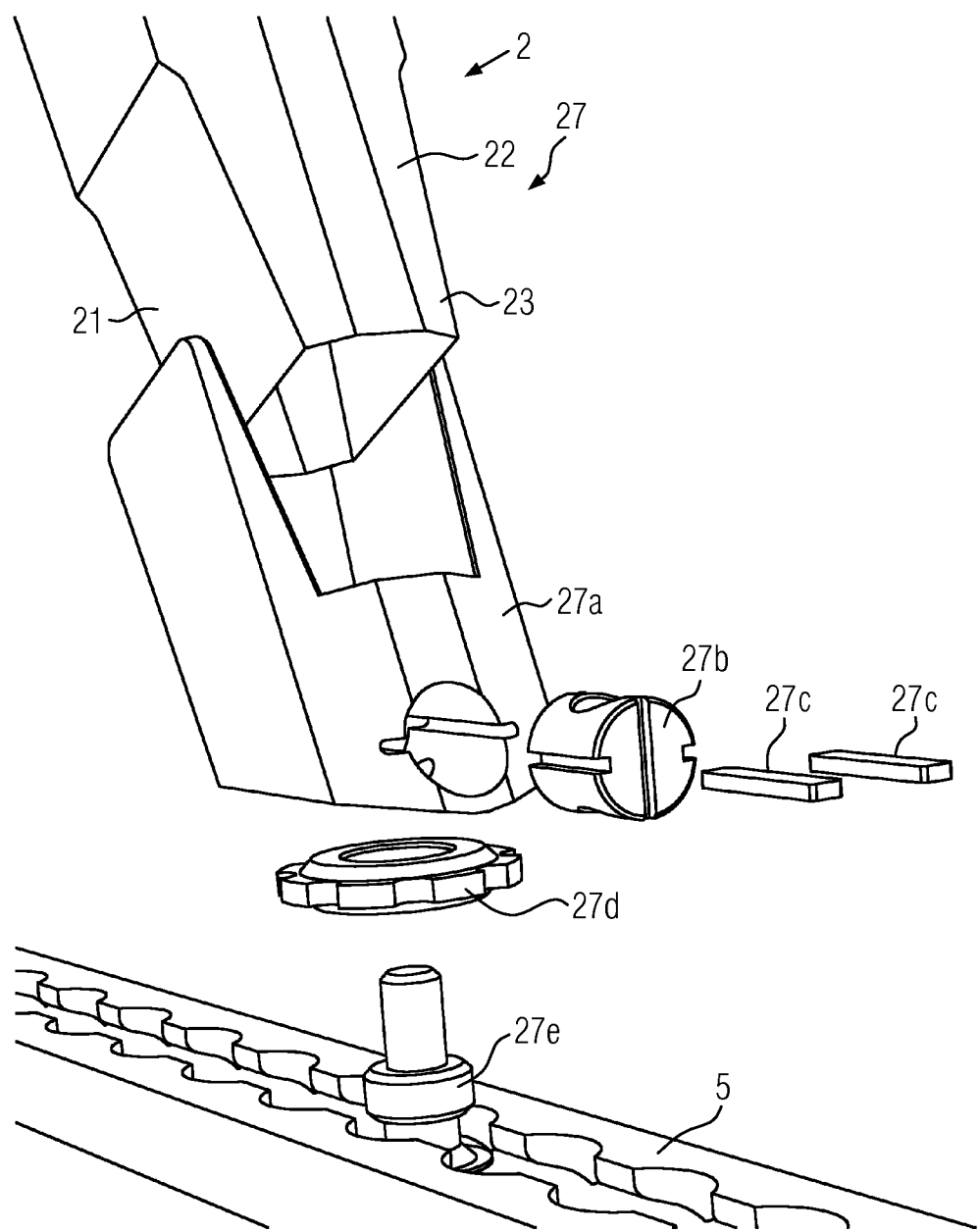
FIG. 11 is another enlarged partial perspective exploded view of the front leg of the leg portion of FIG. 10, combined with parts of the front foot portion and the corresponding rail.
Figure 12:
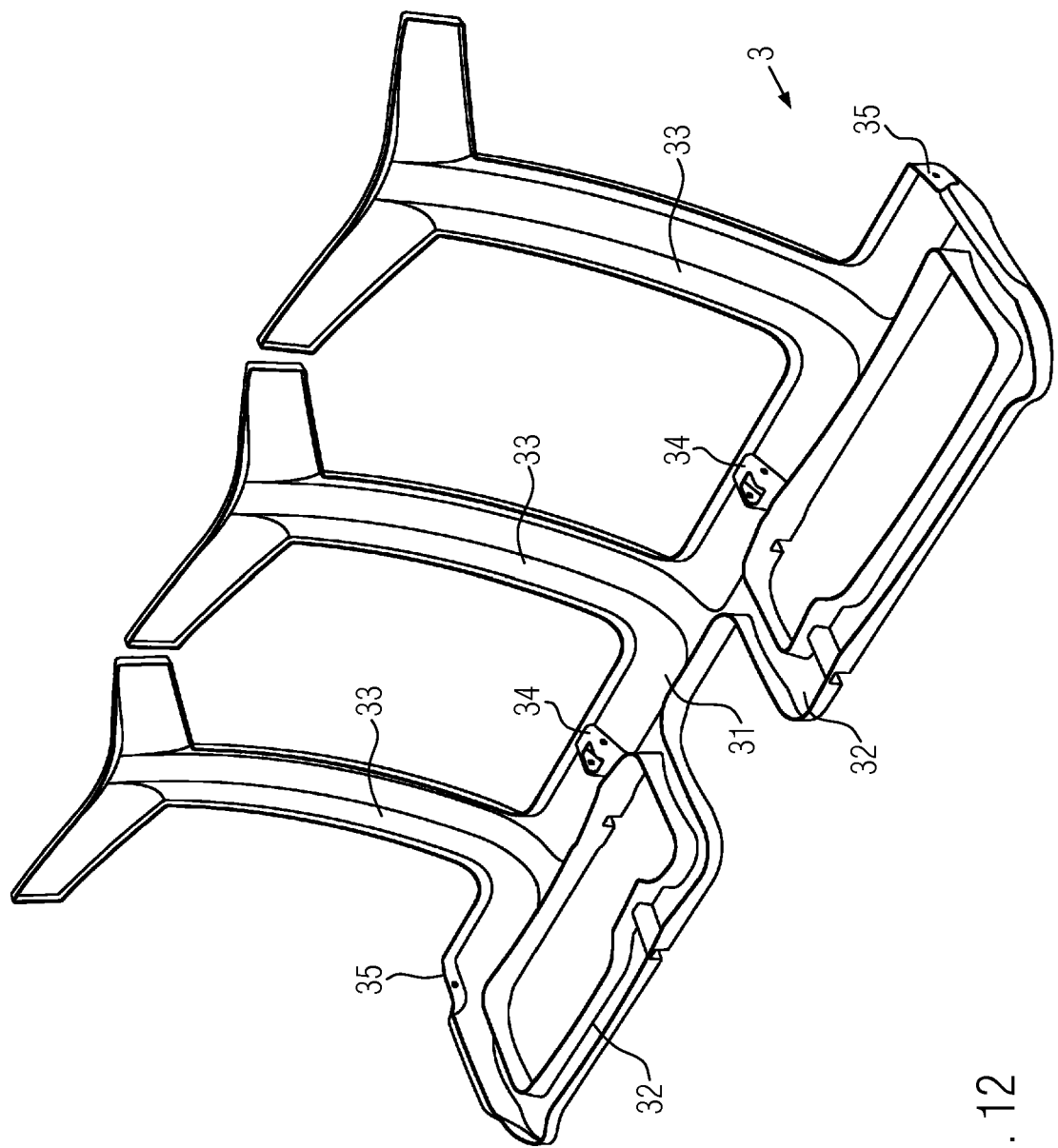
FIG. 12 is a perspective front view of the frame portion of the lightweight aircraft passenger seat assembly according to the present invention.
Figure 13:
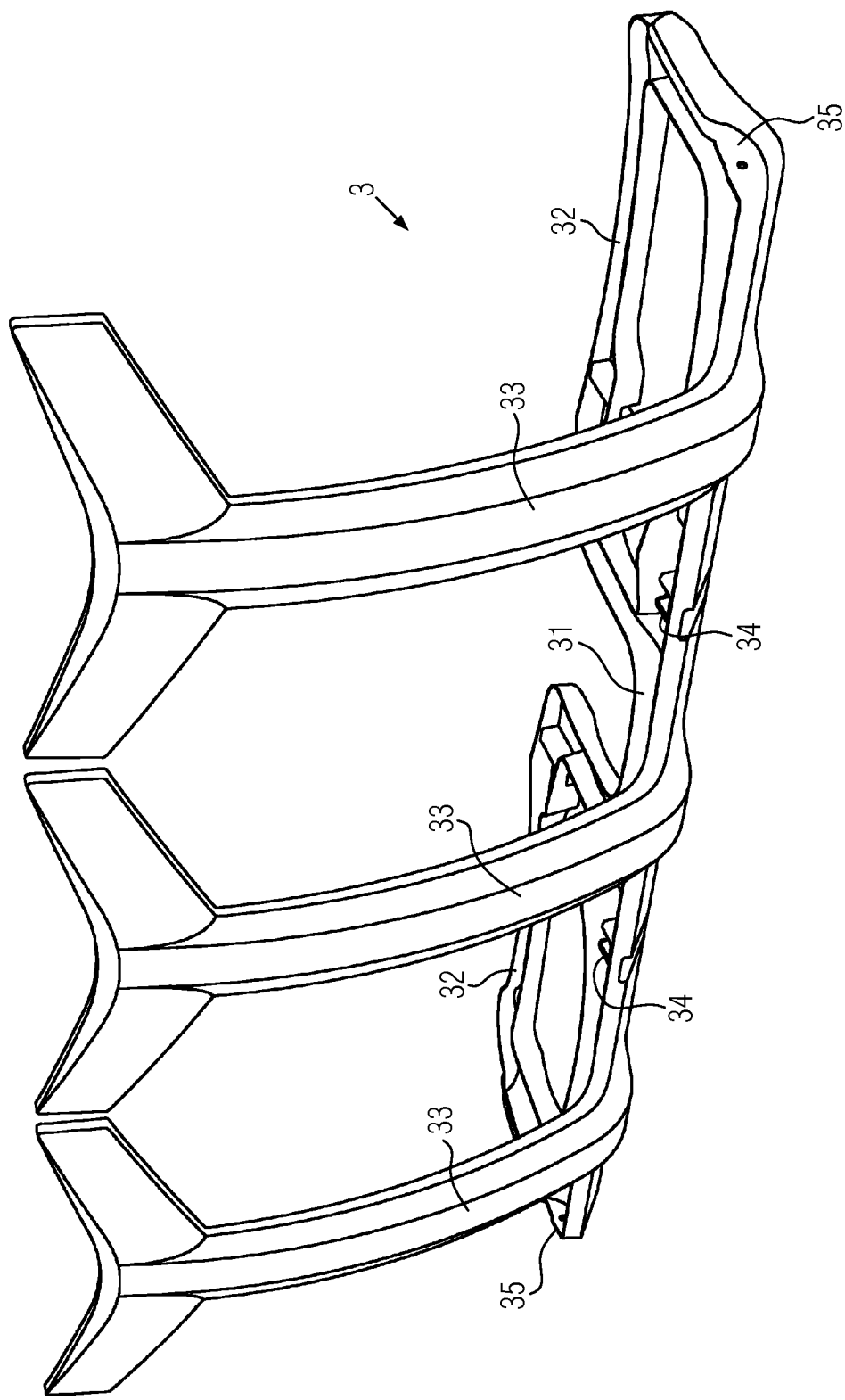
FIG. 13 is a perspective rear view of the frame portion of FIG. 12.
Figure 14:
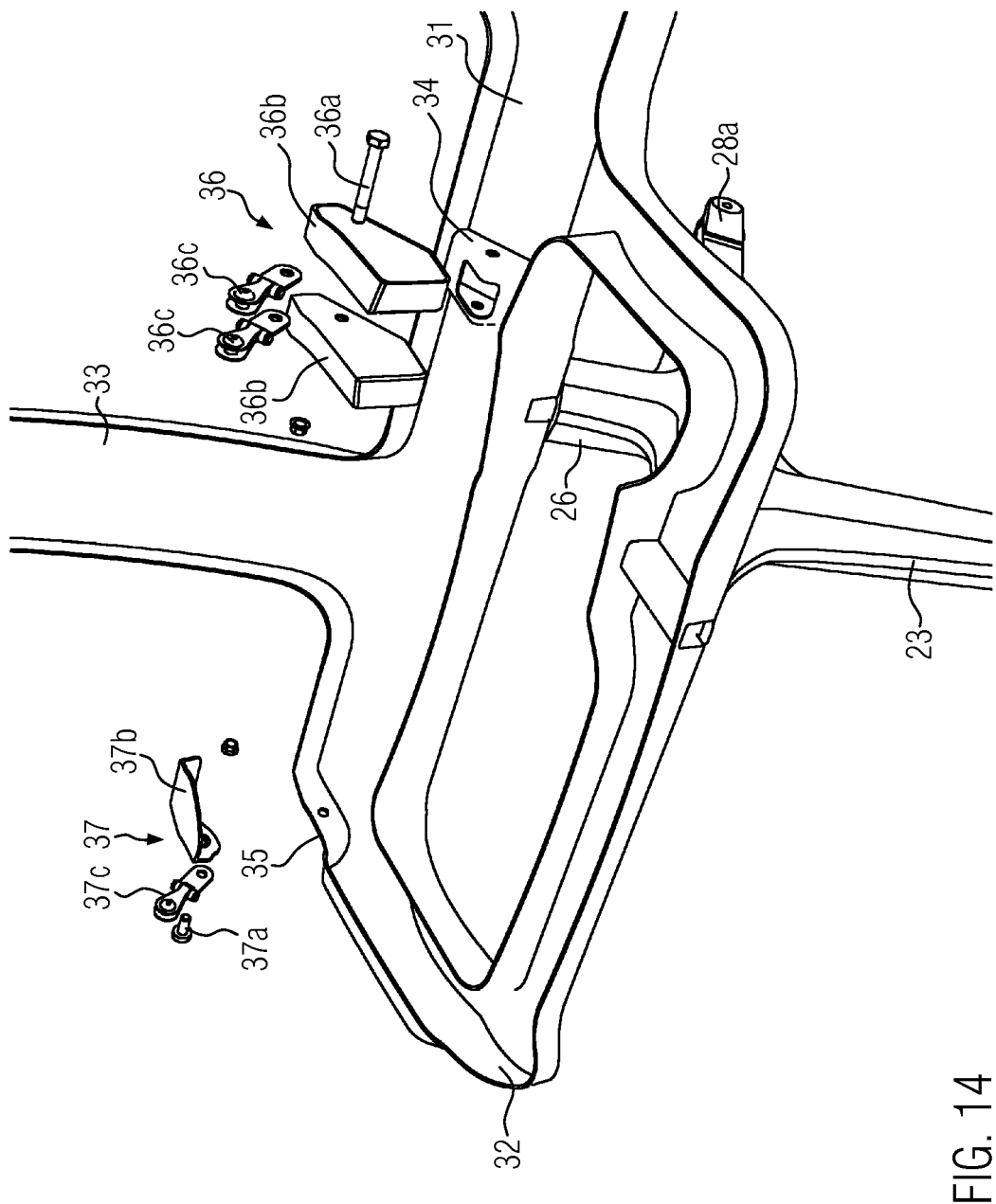
FIG. 14 is an enlarged partial perspective exploded view of the frame portion of FIG. 12 and the leg portion of FIG. 8 combined with parts of passenger safety belt fixtures.
Figure 15:
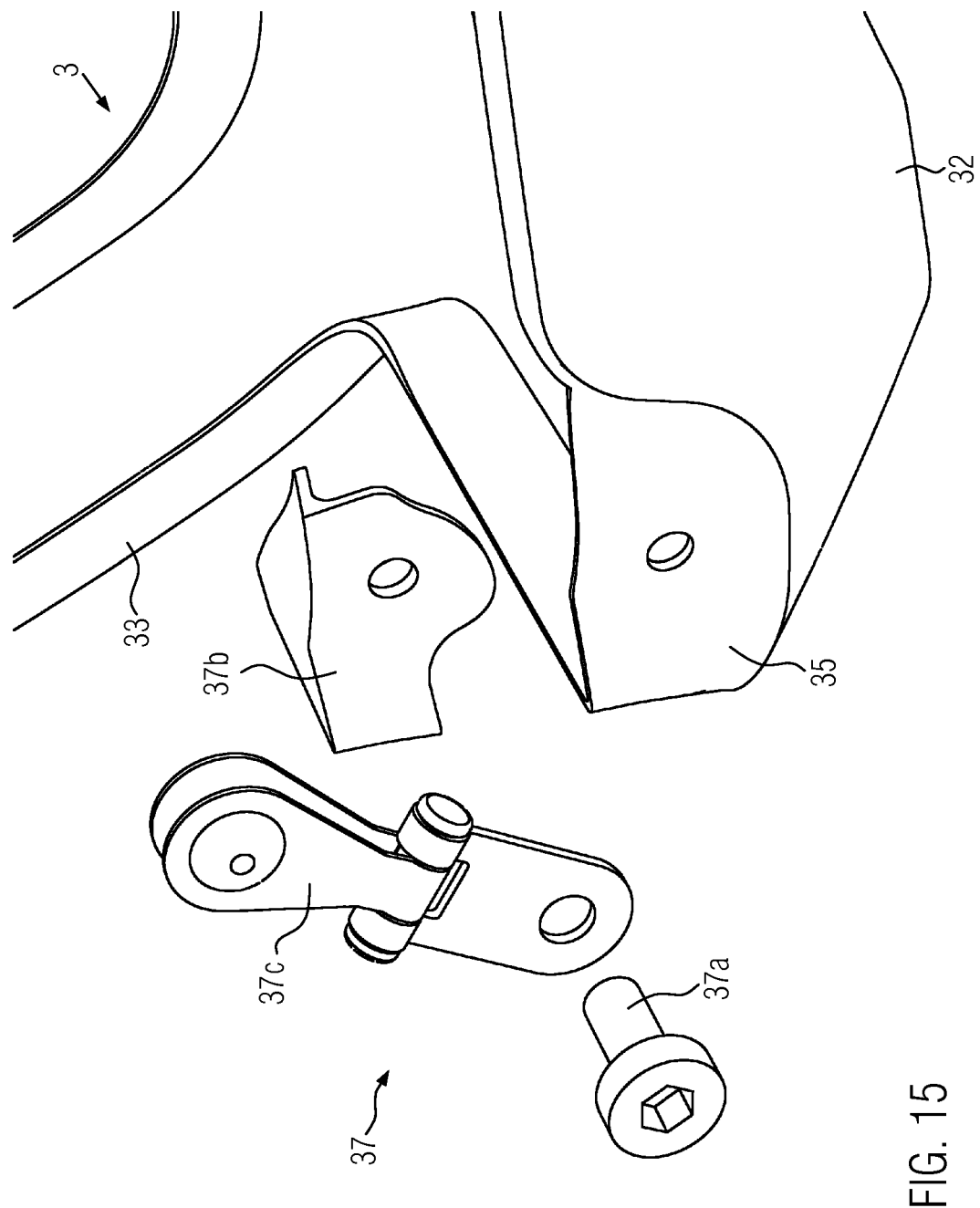
FIG. 15 is a highly enlarged partial perspective exploded view of a rear side part of the frame portion of FIG. 12 combined with parts of passenger safety belt fixtures.
Figure 16:
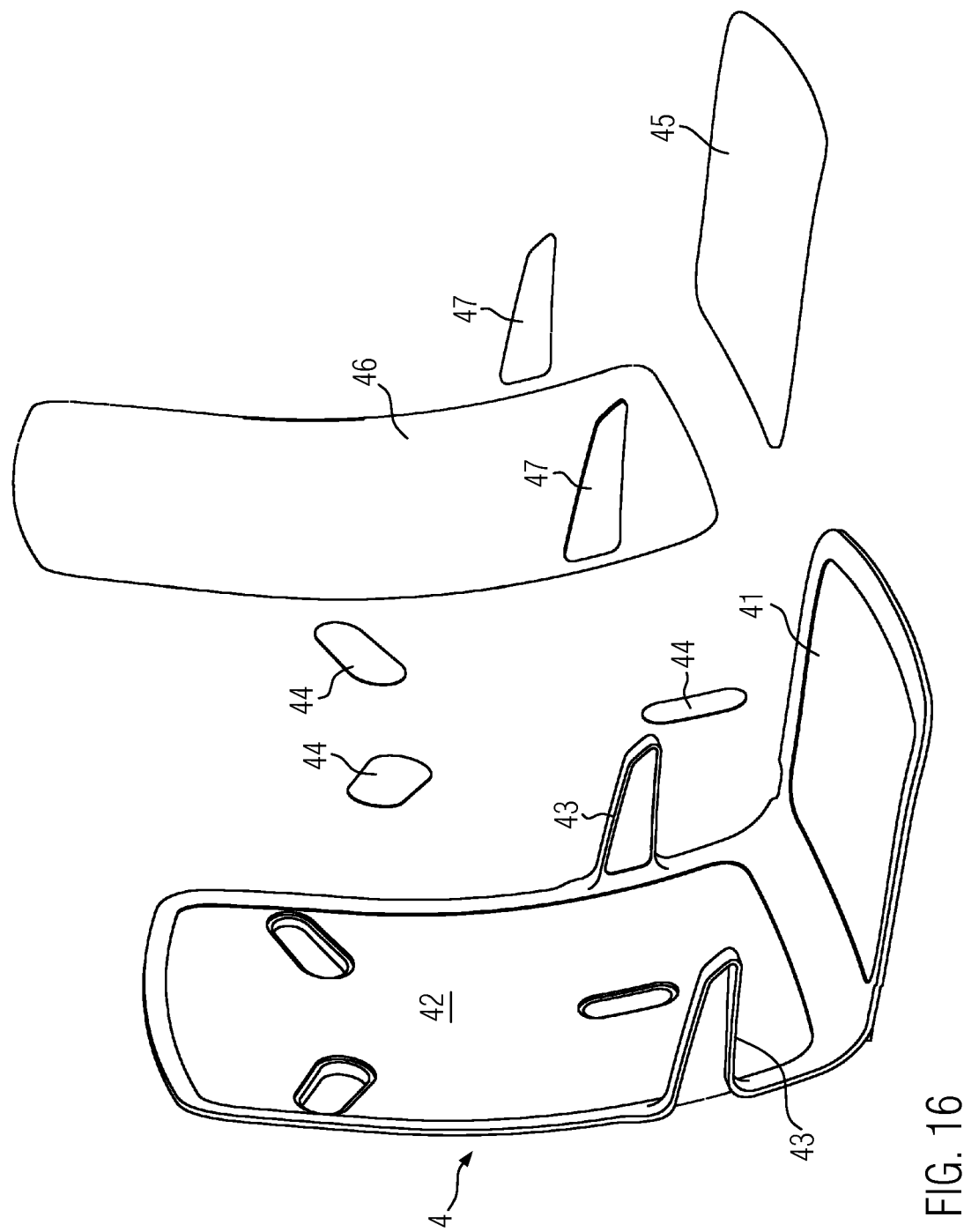
FIG. 16 is a perspective exploded front view of one of the seat portions of the lightweight aircraft passenger seat assembly according to the present invention.
Figure 17:
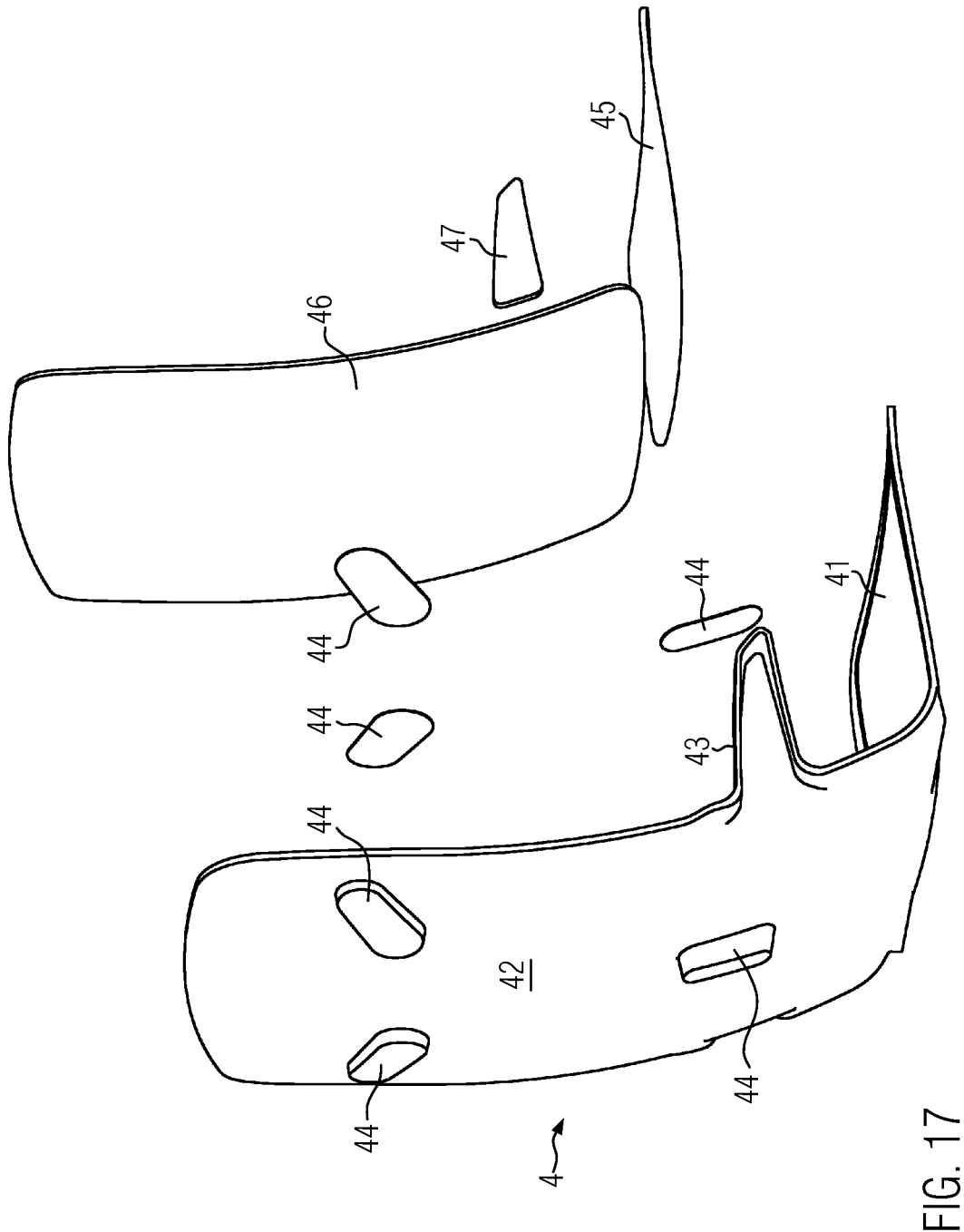
FIG. 17 is a perspective exploded rear view of the seat portion of FIG. 16.
Figure 18:
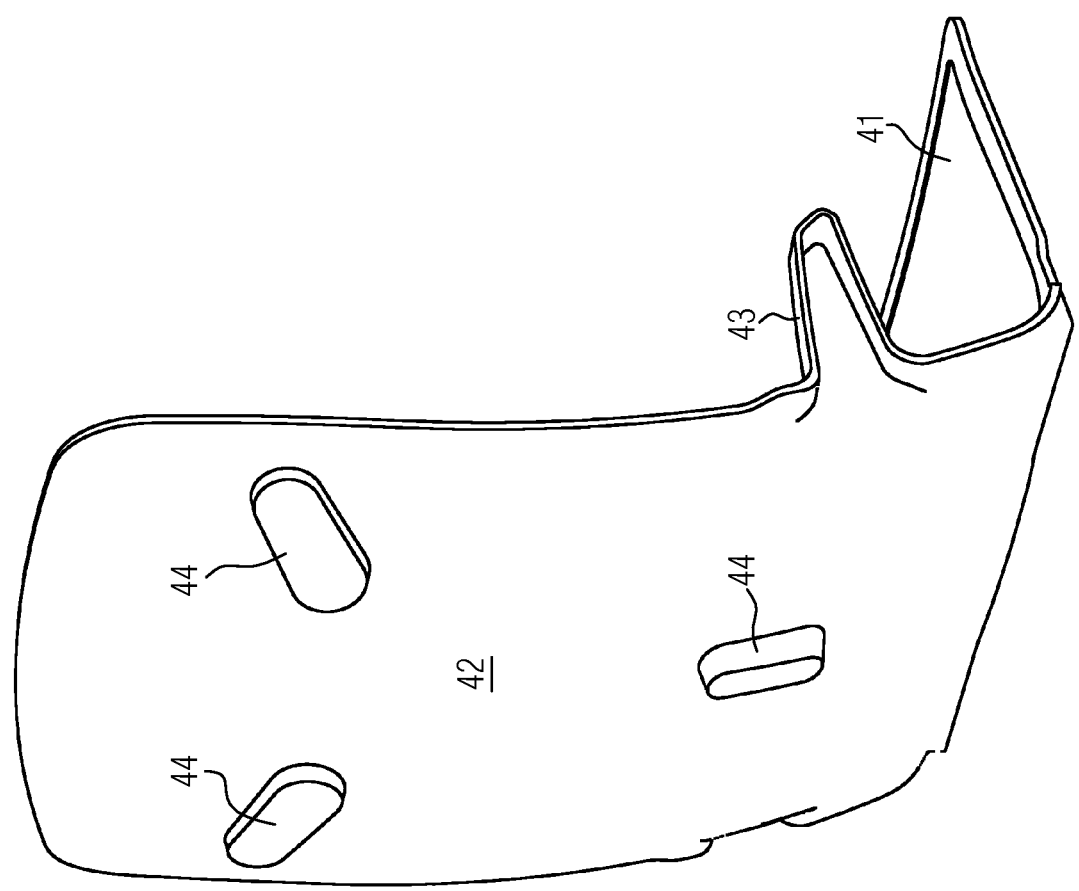
FIG. 18 is a perspective rear view of the seat portion of FIGS. 16 and 17 in an assembled state.
Figure 19:
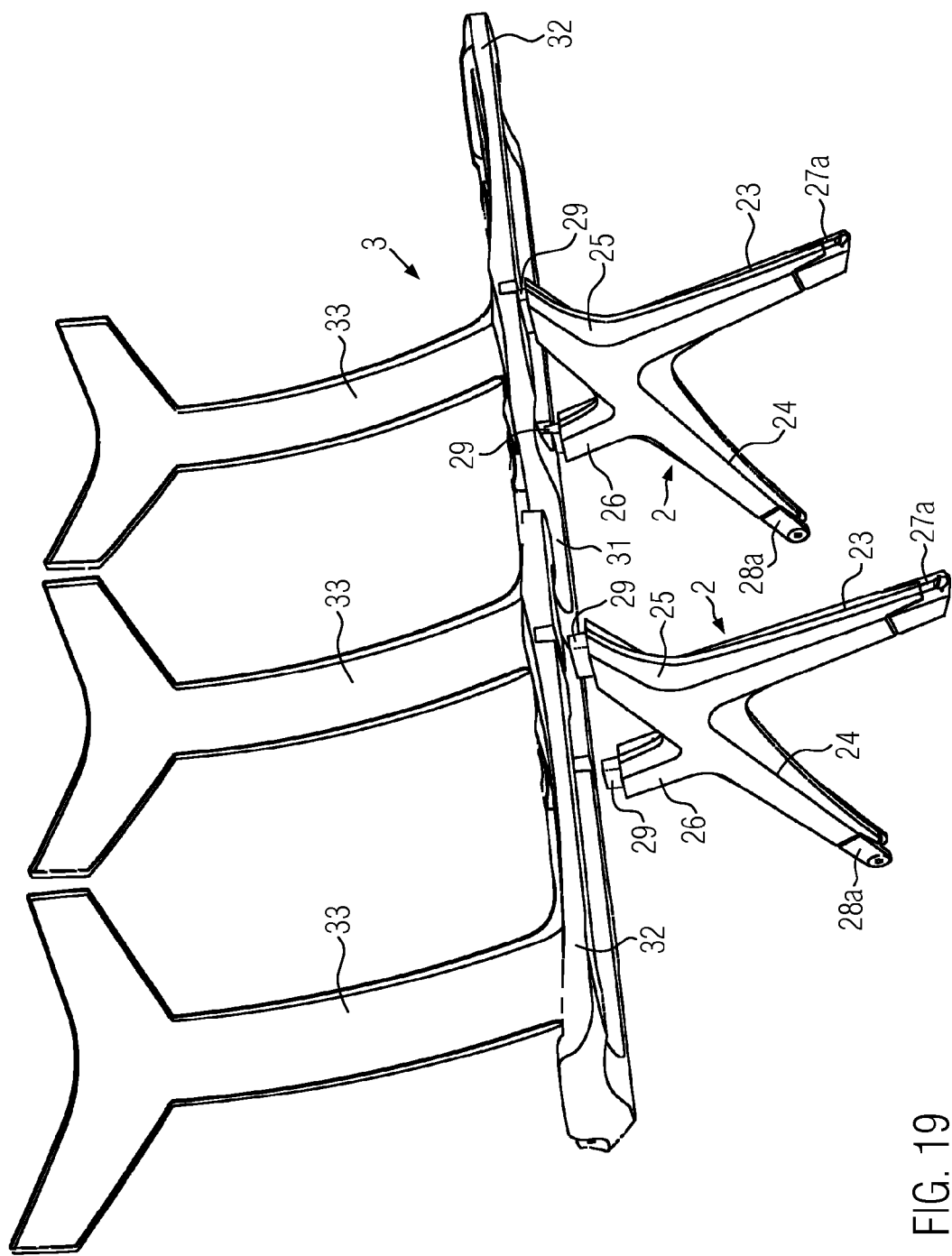
FIG. 19 is a perspective exploded front view of the supporting portion comprising the frame portion of FIG. 12 and two leg portions of FIG. 8.
Figure 20:
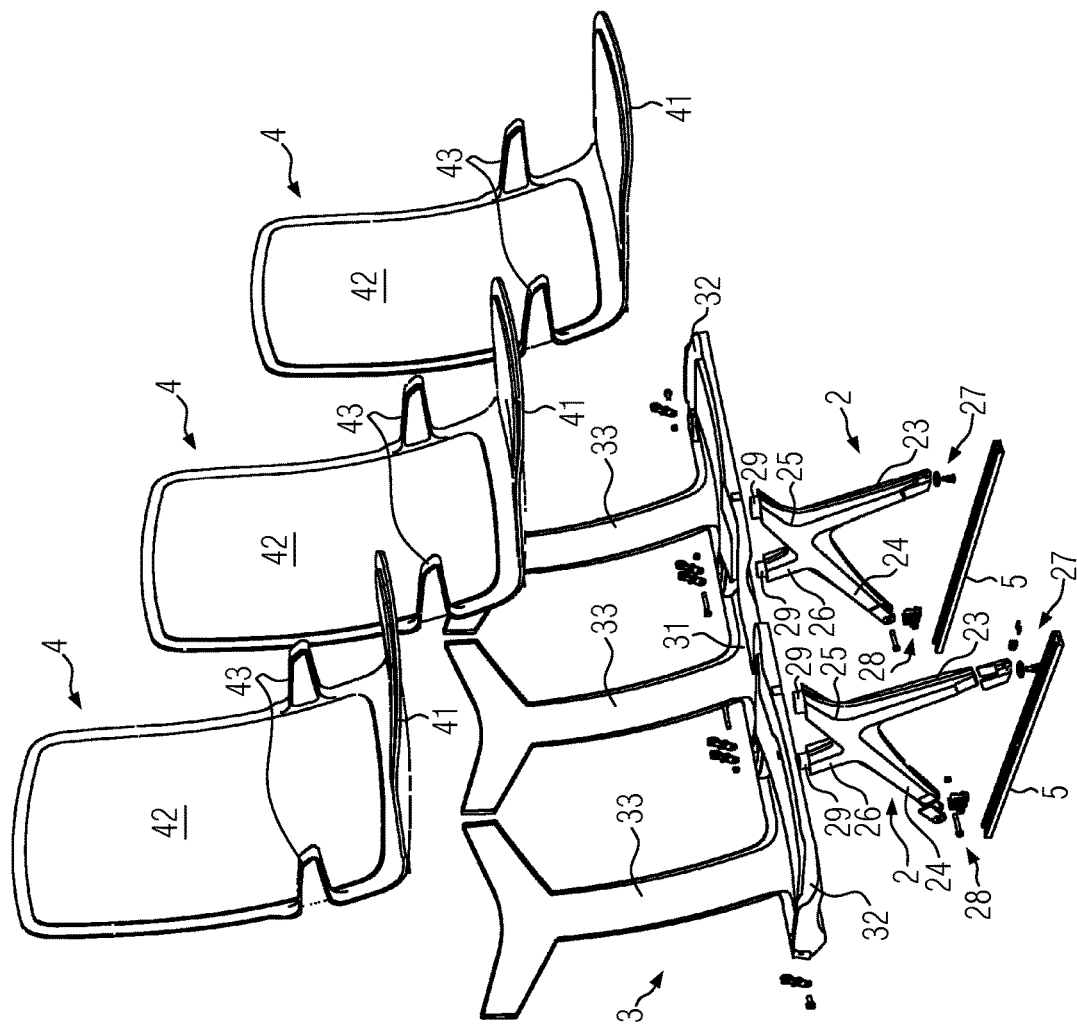
FIG. 20 is a perspective exploded front view of the lightweight aircraft passenger seat assembly according to the present invention, including the supporting portion of FIG. 19 and three seat portions of FIG. 18.
Figure 21:
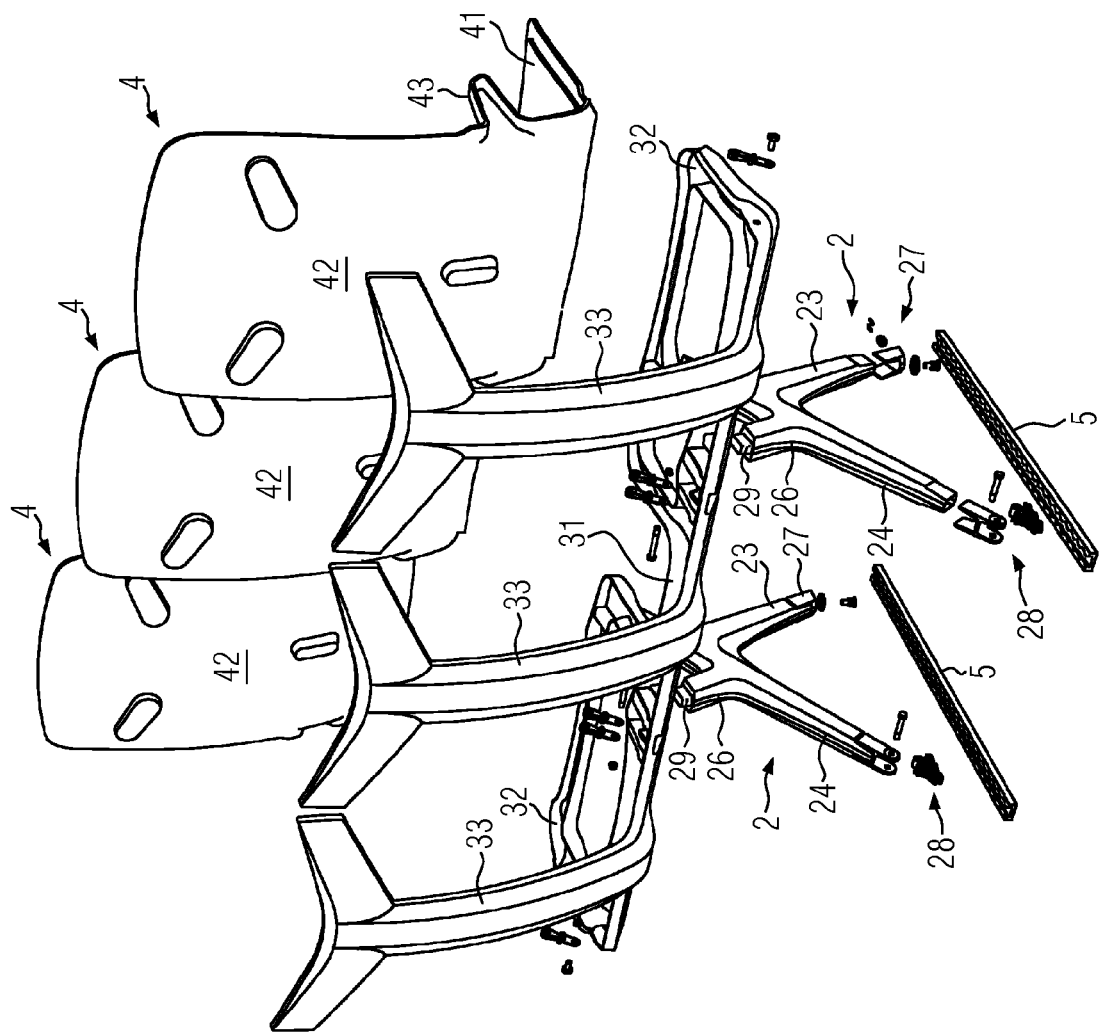
FIG. 21 is a perspective exploded rear view of the lightweight aircraft passenger seat assembly according to FIG. 20.

The individual components of the lightweight aircraft passenger seat assembly 1 will be assembled and installed in an airframe in order to undergo required test conditions according to SAE AS 8049B-2005 as follows:

The leg portions 2 couple the frame portion 3 to the rails 5 supplied and fitted in the air frame. It is geometrically located and bonded to the frame portion 3 via two male boss engagement features 29a, 29c at the upper front and upper rear legs 25, 26. The two bonded (in shear direction) metallic caps 27a, 28a transfer the required test condition preload according to SAE AS 8049B-2005 from the rails 5 into the leg portions 2. The 10° roll condition according to SAE AS 8049B-2005 on the rear leg 24 is accommodated via deformation of the bolt 28c in the rear foot portion 28. The same 10° roll condition according to SAE AS 8049B-2005 on the front leg 23 is accommodated by way of the rotary "fuse" design of the front foot portion 27 as described above. This front foot portion 27 comprises the two shear plates 27c which are designed such that they fail (shear through) at an angular rotation far higher than standard operational use, yet lower than the required 10° preload according to SAE AS 8049B-2005. This allows for any tensile and fore/aft loads through the front leg 23 to be reacted via the barrel nut 27b yet considerably lowers residual stresses in the pre-loaded condition. FIG. 11 details the shear bonding characteristic design of the metallic feet 27. The nut ring 27d, bolt 27e and rail 5 shown are airframe standard fit. As mentioned earlier, the leg 23 is moulded in two symmetrical halves 21, 22, split down the center plane, and the halves 21, 22 are bonded together and mechanically encapsulated via the caps 27a, so as to realize a monolithic laminate design.

The frame portion 3 is coupled with the rail 5 via the leg portions 2 and the foot portions 27, 28 and consists of the actual seating support including the beam portion 31, two loop portions 32 and three spine portions 33, which are used to support the three individual seat shells 40. Again, it is a monolithic laminate design.

Having accommodated the roll 10 degree condition according to SAE AS 8049B-2005 with the application of the feet designs, the 10 degree pitch condition is accommodated through the twisting of the single section center beam portion 31. This area also connects the center seat's spine portion 33. This torsion box is designed both geometrically and in laminate definition to allow the 10 degree rotation deformation without failure and whilst maintaining structural integrity to continue to pass both the 14G downward and 16G forward dynamic tests prescribed by SAE AS 8049B-2005.

The frame portion 3 also carries the coupling points for the passenger seat belts. These are supported internally with the addition of a metallic insert—designed such that it spreads the bearing load of the coupling into the composite structure.

The seat shell 40 is a one-piece composite sandwich construction. The core material is a closed cell foam. Pads 45, 46, 47 for comfort are bonded onto the front of the seat shell 40.

One important feature in allowing the complete assembly to absorb the 10 degree pitch condition, through the beam portion 31 (torsion box) in the frame portion 3, is the de-coupled seat shell 40 from the frame portion 3. The seat shell 40 itself is bonded in only three places to the spine portions 33 of the frame portion 3. The sitting portion 41 of the seat shell 40 may only rest on the actual seating support including the beam portion 31 and two loop portions 32 of the frame portion 2 without a mechanical or other connection. However, it is also possible to connect, particularly mechanically connect, the sitting portion 41 of the seat shell 40 to the respective seating support including the beam portion 31 and two loop portions 32. This improves the stability of the respective seat, particular for the case a rearward passenger pulls on the backrest portion 42 in order to stand up. Thereby, it may be desirable to connect the sitting portions 41 of the outer seat shells 40 of the seat assembly 1 to their respective seating supports, but leaving the sitting portion 41 of the center seat shell 40 disconnected and/or decoupled from its seating support, thus, maintaining the flexibility of the frame portion 3, particularly of the beam portion 31.

The seat shell 40 has two integrated fixed position armrests, one per side. This removes the need to attach the armrest to the traditional "hanger".

Figure 22:
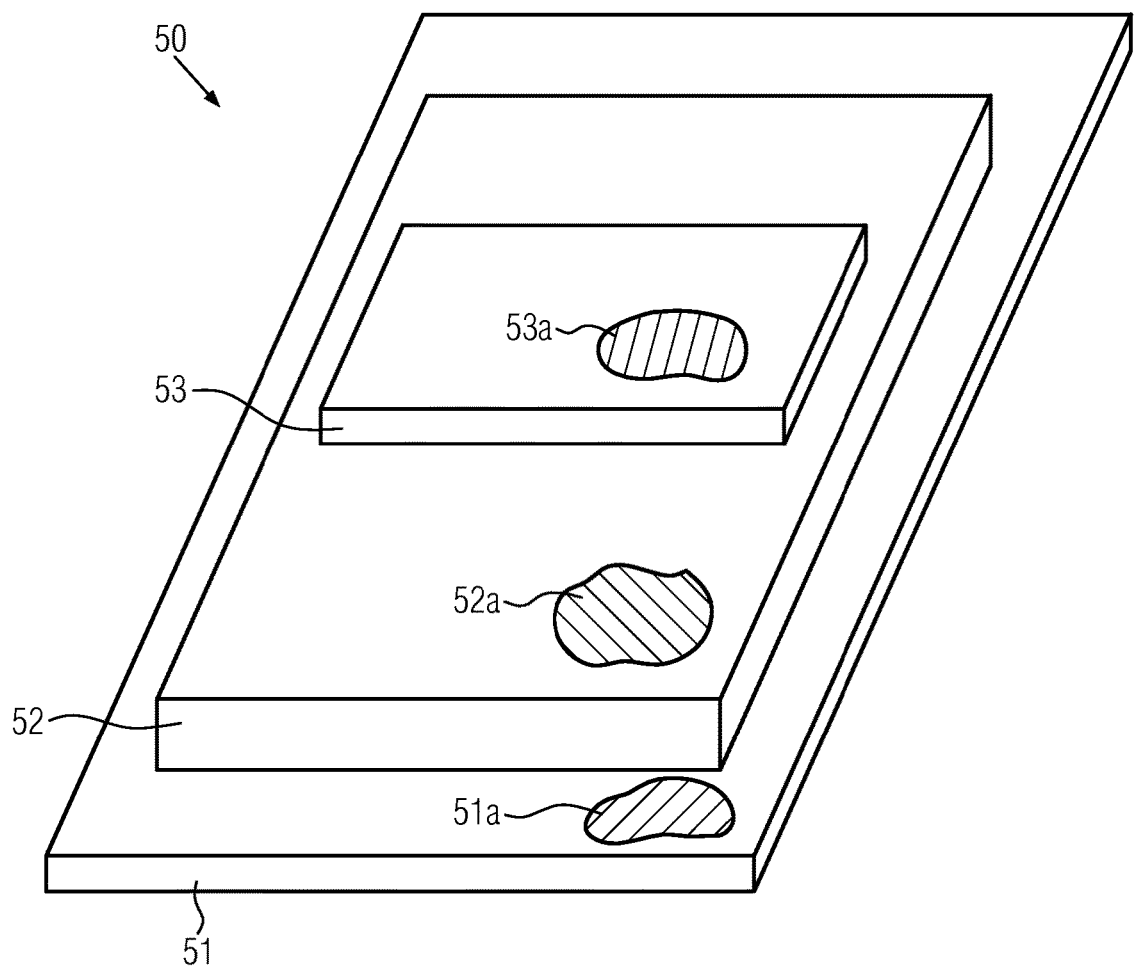
FIG. 22 is a perspective view of a layer structure of a lightweight component for a lightweight seat assembly.

FIG. 22 shows a schematic layer structure 50 of a lightweight component. The features of the layer structure 50 may be applied to any lightweight component 2, 3, 4 of the lightweight seat assembly 1, whereas the layers of the layer structure 50 may be shaped in any form desired for the respective application.

Layer structure 50 comprises a first layer 51, a second layer 52 and a third layer 53, whereas every layer 51, 52, 53 may be a fiber layer. First layer 51 may be made of a different material than second layer 52 and second layer 52 may be made from a different layer than third layer 53. Likewise, it is possible that all three layers 51, 52, 53 are made from the same material or only two of the three layers are made from the same material and the remaining layer is made from a different material. Fiber layer 51 may have a smaller or greater thickness than fiber layer 52, and fiber layer 52 may have a smaller or greater thickness than fiber layer 53. Likewise, it is possible that all fiber layers 51, 52, 53 have the same thickness or only one of the fiber layers 51, 52, 53 has a smaller or greater thickness than the remaining two fiber layers.

Fiber layer 51 may be a primary fiber layer and fiber layer 52 may be an enforcement fiber layer.

The fibers 51a of fiber layer 51 may have a different orientation than the fibers 52a of the fiber layer 52 and the fibers 52a of the fiber layer 52 may have a different orientation than the fibers 53a of the fiber layer 53. Likewise, it is possible that the fibers 51a, 52a, 53a of the fiber layers 51, 52, 53 have the same orientation, or that only one fiber layer has a different fiber orientation than the remaining two fiber layers.

Furthermore, the second fiber layer 52 may cover a smaller area than the first fiber layer 51 and the third fiber layer 53 may cover a smaller area than the second fiber layer 52. Likewise, it is possible that all fiber layers 51, 52, 53 cover the same area, or that only one of the fiber layers 51, 52, 53 covers a different area than the remaining two fiber layers.

FIGS. 23a to 23f depict different layer compositions of a fiber layer structure 50. According to FIG. 23a, the fibers 51a of the first fiber layer 51 have the same orientation as the fibers 52a of the second fiber layer 52. According to FIG. 23b, the fibers 51a of the first fiber layer 51 have an orientation perpendicular to the fibers 52a of the second fiber layer 52. According to FIG. 23c, the fibers 51a of the first fiber layer 51 have an orientation which is arranged at an angle of 45° relative to the orientation of the fibers 52a of the second fiber layer 52. According to FIG. 23d, the fibers 51a of the first fiber layer 51 have an orientation which is arranged at an angle of 45° relative to the orientation of the fibers 52a of the fiber layer 52, and the fibers 51a of the first fiber layer 51 have an orientation perpendicular to the orientation of the fibers 53a of the third fiber layer 53. According to FIG. 23e, the fibers 51a of the first fiber layer 51 and the fibers 53a of the third fiber layer 53 have the same orientation, whereas the fibers 52a of the second fiber layer, which second fiber layer 52 is arranged between the first fiber layer 51 and the third fiber layer 53, have an orientation which is arranged at an angle of 45° relative to the orientation of the fibers 51a of the first fiber layer 51 and the fibers 53a of the third fiber layer 53.

Figure 23A:
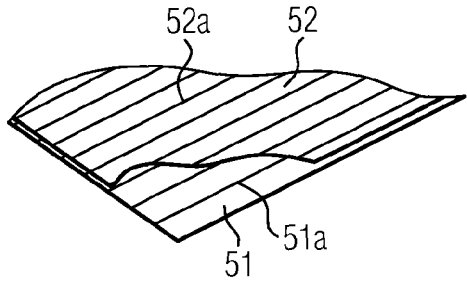
FIG. 23*a*-23*f* are perspective views of layer structures of a lightweight component for a lightweight seat assembly.
Figure 23B:
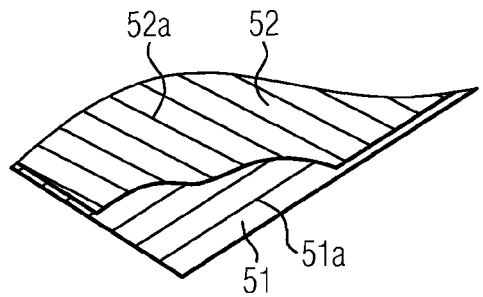
Figure 23C:
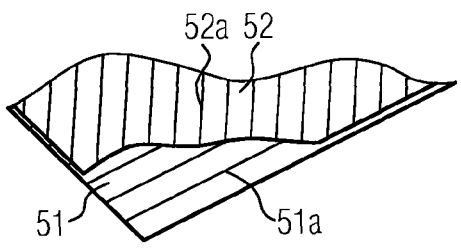
Figure 23D:
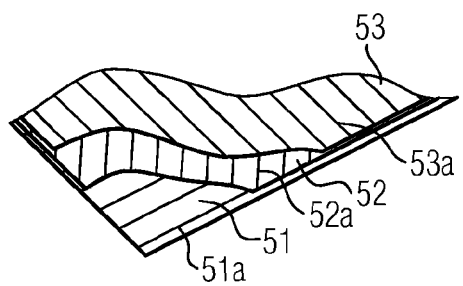
Figure 23E:
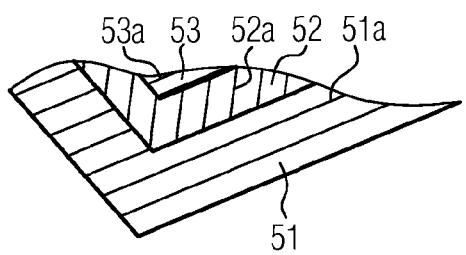
Figure 23F:
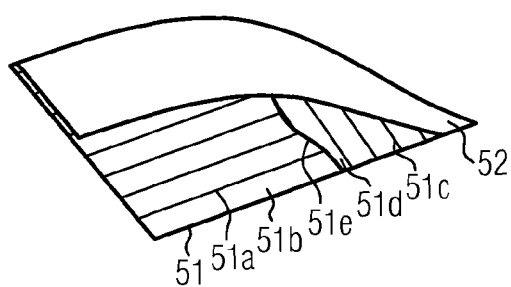

According to FIG. 23f, the first fiber layer 51 has a first layer portion 51b and a second layer portion 51d, whereas the fibers 51a of the first layer portion 51b have a different orientation than the fibers 51c of the second layer portion 51d. The layer portions 51b and 51d abut along a butt-join 51d. The first fiber layer 51, with its two layer portions 51b and 51d, is covered by a second fiber layer 52, which may have a fiber orientation identical to the fiber orientation of the first layer portion 51b or the second layer portion 51d, or different to the layer portions 51b and 51d.

FIGS. 24a to 24d depict different configurations for fiber layers being separated into different layer portions in a cross-sectional view. According to FIG. 24a, the first fiber layer 51 comprises a first layer portion 51b and a second layer portion 51d, wherein the first layer portion 51b and the second layer portion 51d abut along a butt-join 51e. The second layer 52 is not intersected and therefore continuously covers the butt-join 51e.

Figure 24A:
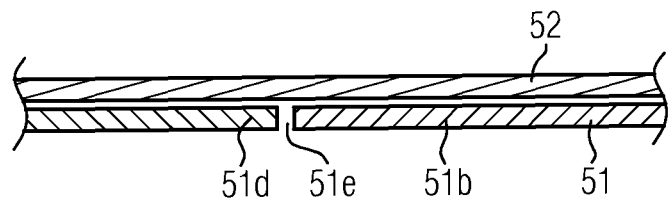
FIG. 24*a*-24*d* are cross-sectional views of layer structures of a lightweight component for a lightweight seat assembly.
Figure 24B:
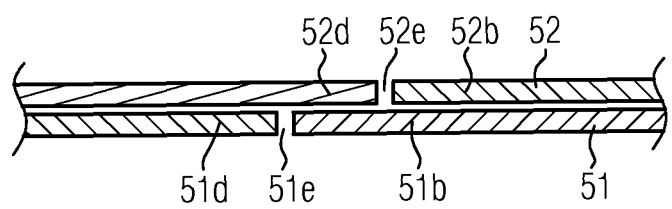

According to FIG. 24b, the second layer 52 is also separated into a first layer portion 52b and a second layer portion 52d, whereas the first layer portion 52b and the second layer portion 52d abut along a butt-join 52e. However, the butt-join 52e is positioned at a distance from the butt-join 51e in an orientation length-wise to the layers 51 and 52. The risk of damages to the component in the region of one of the butt-joins 51e or 52e is thereby reduced.

Figure 24C:
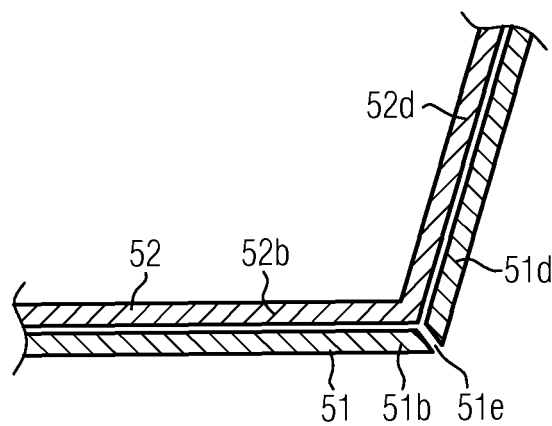

According to FIG. 24c, the first layer 51 has a first layer portion 51b and a second layer portion 51d, whereas the first layer portion 51b and the second layer portion 51d abut along a butt-join 51e. Furthermore, the first layer portion 51b and the second layer portion 51d are arranged at an angle relative to each other. Thereby, the butt-join 51e extends along the edge between the two angled layer portions 51b and 51d. Likewise, the second layer 52 has a first layer portion 52b and a second layer portion 52d. Likewise, the two layer portions 52b and 52d are arranged at an angle relative to each other, however, the two layer portions 52b and 52d are not intersected by a butt-join in the region of the edge but continuously extend along the edge.

Figure 24D:
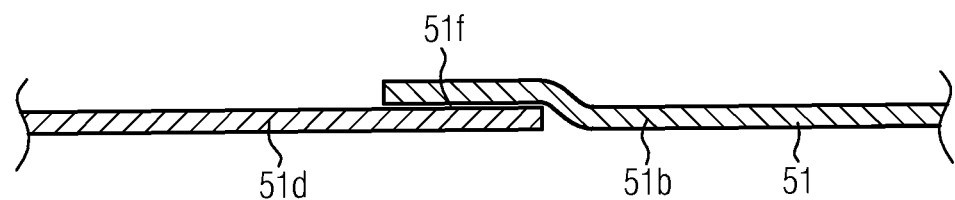

According to FIG. 24d, the fiber layer 51 comprises a first layer portion 51b and a second layer portion 51d, wherein the first layer portion 51b and the second layer portion 51d overlap in an adjoining region 51f, thereby ensuring a high stability, particularly in the adjoining region 51f.

Figure 25:
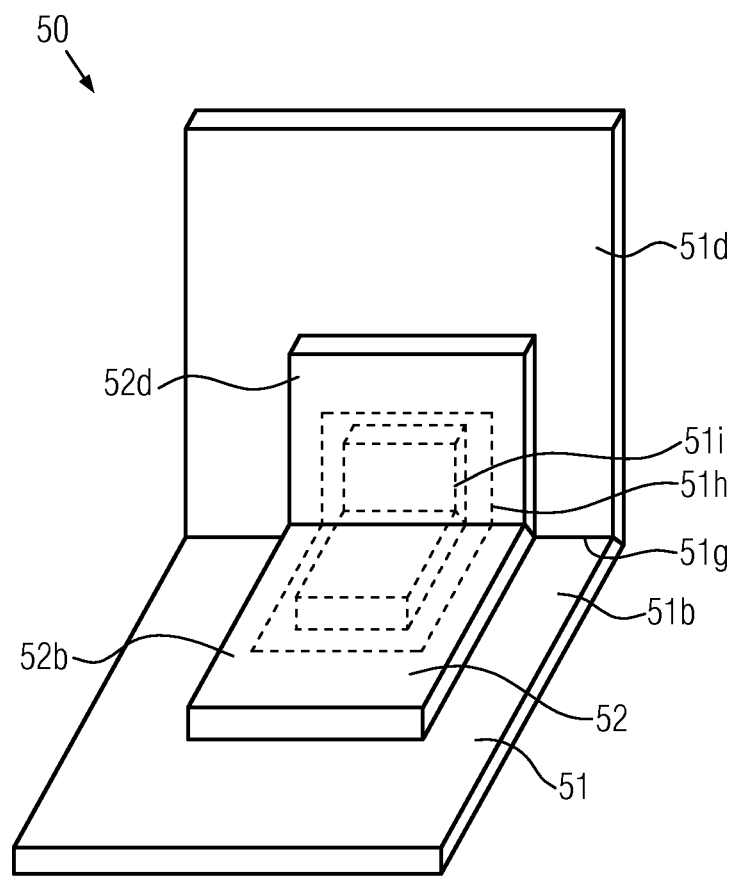
FIG. 25 is a perspective view of a further layer structure of a lightweight component for a lightweight seat assembly.

According to FIG. 25, the first layer 51 has a first layer portion 51b and a second layer portion 51d, whereas the first layer portion 51b and the second layer portion 51d are arranged at an angle relative to each other. The edge between the first layer portion 51b and the second layer portion 51d is configured as a force transmission portion, as it transmits forces between the first layer portion 51b and the second layer portion 51d. However, the force transmission portion may not be limited to the edge but also may comprise portions adjacent to the edge. Likewise, the force transmission portion does not necessarily comprise an edge but may contain any portions of a component, which are configured to transmit significant forces between adjacent component portions during operation of the respective component.

Likewise, the second layer 52 comprises a first layer portion 52b and a second layer portion 52d, which layer portions are arranged at an angle relative to each other. The second layer 52, with its two layer portions 52b and 52d, at least partially covers the force transmission portion 51g, in order to reinforce it.

Furthermore, the first fiber layer 51 may have a force application portion 51h, which may be configured for receiving external forces, for example, by connecting the force application portion with another component of the seat assembly. The force application portion 51h may comprise a cut-out 51i, whereas the cut-out may extend along the first layer portion 51b and also the second layer portion 51d. The cut-out may ensure a stress reduction in the first fiber layer 51. The force application portion 51h, with its cut-out 51i, may be covered by the second layer 52, in order to sufficiently stabilize the respective component in the region of the force application portion 51h.

Figure 26:
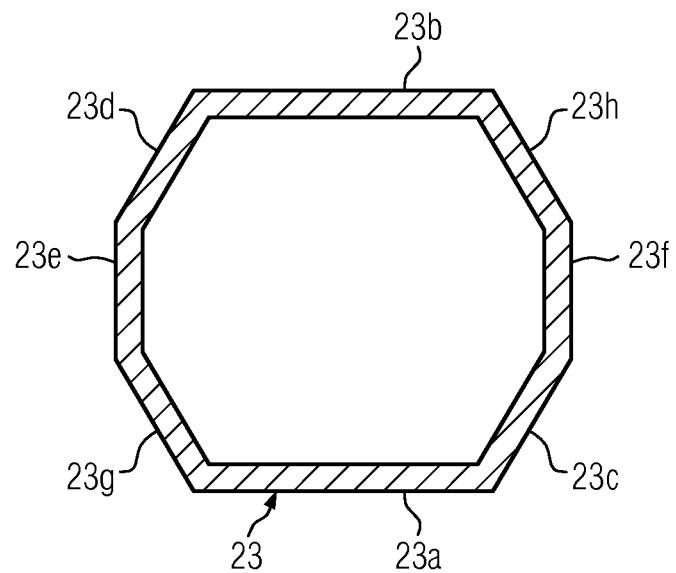
FIG. 26 is a cross-sectional view of a leg of the leg portion in a length-wise orientation of said leg.

FIG. 26 shows a cross-sectional view of leg 23 of the leg portion 2 in a length-wise orientation of leg 23. The features described in the context of FIG. 26 may likewise be applied to legs 24, 25, 26 of the leg portion 2. The cross-section of leg 23 comprises a first base section 22a and a second base section 22b, whereas the first section 23a and the second base section 23b may be arranged parallel to each other and the cross-sectional lengths of the base sections 23a, 23b may be identical.

Further, the cross-section of the leg 23 may comprise three flank sections pairs 23c, 23d; 23e, 23f; 23g, 23h, whereas the flank sections of each flank section pair 23c, 23d; 23e, 23f; 23g, 23h may be arranged parallel to each other. Thereby, flank section 23c and flank section 23g may be connected to base section 23a at its opposite ends, flank section 23d and flank section 23h may be connected to base section 23b at its opposite ends, flank section 23f may connect flank section 23c and flank section 23h and flank section 23e may connect flank section 23d and flank section 23g. In this arrangement, the cross-section of leg 23 forms an octagon.

Figure 27:
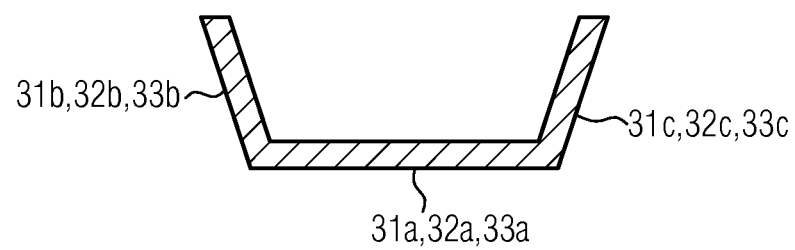
FIG. 27 shows a cross-sectional view of a portion of the frame portion perpendicular to a length-wise orientation of the respective portion of the frame portion.

FIG. 27 shows a cross-sectional view of the beam portion 31, of a straight section of the loop portion 32, of a connection portion of the loop portion 32 or of the spine portion 33 perpendicular to a length-wise orientation of the respective beam portion 31, the respective straight section of the loop portion 32, the respective connection portion of the loop portion 32 or the respective spine portion 33. The cross-section of the respective portion 31, 32, 33 may have a base section 31a, 32a, 33a and a first flank section 31b, 32b, 33b and a second flank section 31c, 32c, 33c, whereas the flank sections 31b, 32b, 33b, 31c, 32c, 33c may be connected to the base section 31a, 32a, 33a at its opposite ends and under an angle to the base section 31a, 32a, 33a. In this arrangement, the cross-section of the respective beam portion 31, of the respective straight section of the loop portion 32, of the respective connection portion of the loop portion 32 or of the respective spine portion 33 forms an open profile.

In the following a second preferred embodiment of the claimed invention will be described with reference to FIGS. 28 to 34, whereas basically the differences to the first embodiment described above will be discussed. Thereby, components identical to the first embodiment of the present invention will be assigned identical reference signs, and components different to those of the first embodiment of the invention will be assigned different reference signs.

Figure 28:
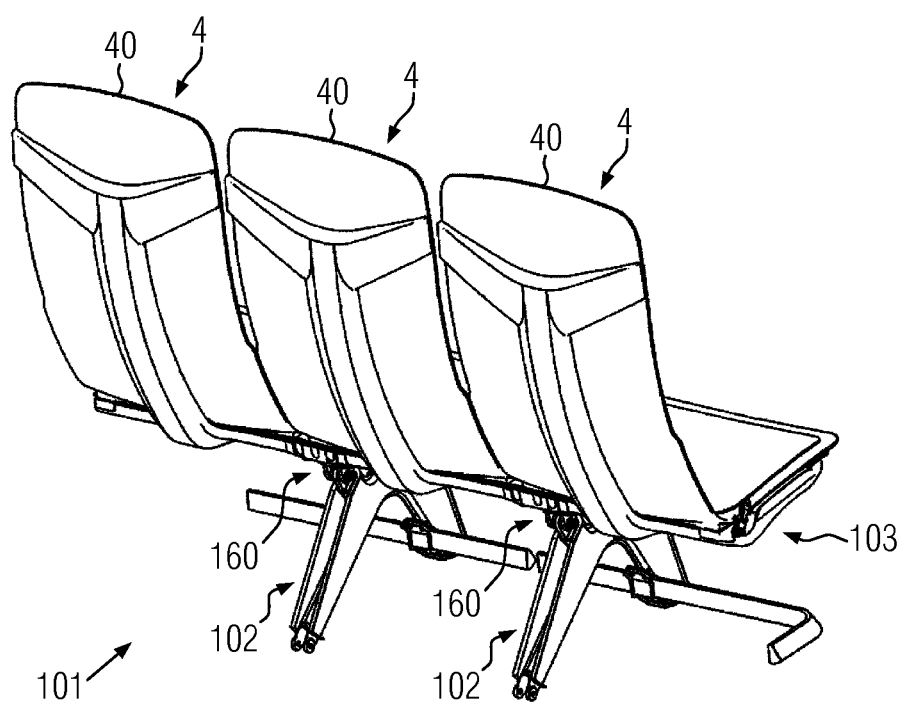
FIG. 28 is a perspective rear view of the lightweight aircraft passenger seat assembly according to a second embodiment of the present invention.

FIG. 28 shows a lightweight aircraft passenger seat assembly 101 according a second embodiment of the present invention. The lightweight aircraft passenger seat assembly 101 comprises three seat portions 4, each one having seat shell 40 for an aircraft passenger, and a supporting portion 102, 103 for supporting the three seat portions 4 relative to an aircraft structure. Although seat assembly 101 is depicted as a triple seat assembly, this embodiment can be extended to any practical seat configuration, such as a double seat, a quad seat, a single seat, or a seat configured to accommodate any number of passengers.

As will be described in the following, the supporting portion 102, 103 and the three seat shells 40 are constructed as lightweight components using a fiber reinforced composite material. The supporting portion 102, 103 of the preferred embodiment contains two leg portions 102 and one frame portion 103. Hence, the lightweight aircraft passenger seat assembly 101 is constructed of three primary components, namely the leg portions 102, the frame portion 103 and the seat portions 4. The two leg portions 102 and the three seat shells 40 will be connected to the one frame portion 103. In particular, each leg portion 102 is connected to the frame portion 103 via rotary joints 160 and 170, which are described in more detail with reference to FIG. 32.

Figure 29:
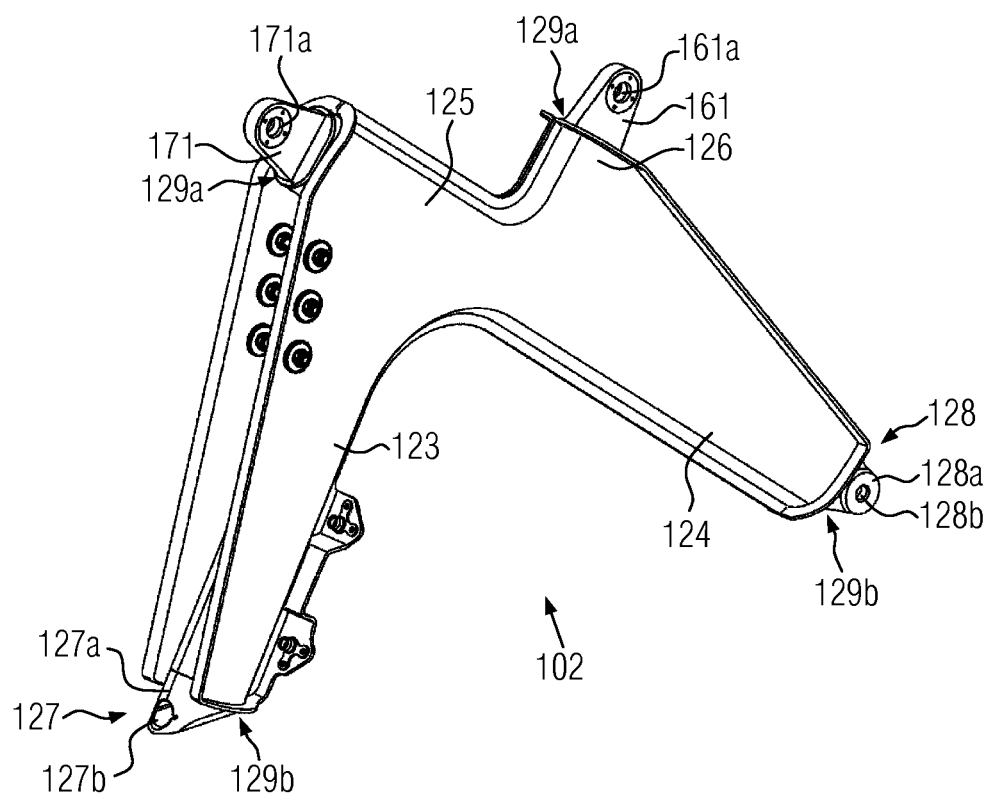
FIG. 29 is a perspective view of a leg portion of the lightweight aircraft passenger seat assembly according to a second embodiment of the present invention combined with parts of the respective front and rear foot portions.

As shown in FIG. 29, also the leg portions 102 comprise four legs 123, 124, 125, 126 each, wherein each leg 123, 124, 125, 126 is made from a laminated fiber reinforced composite material. Two legs 124, 125 of each leg portion 102 extend along a continuous straight line between a front frame-side connecting portion and a rear foot portion 128. The leg 123 branches-off from the leg 125 to extend downward to a front aircraft-side coupling portion, whereas the leg 126 branches-off from the leg 124 to extend upward to a rear frame-side connecting portion.

Furthermore, the leg portion 102 comprises three separate bodies, namely an internal structure 120 and two symmetrical halves 121 and 122, which are split down the center plane, and are bonded, preferably bolted and/or welded, together, in order to at least sectionwise encapsulate the internal structure body 120. At the same time the two symmetrical halves 121 and 122 form an open profile.

In particular, the symmetrical halves 121 and 122 in the area forming the first leg 123 and/or the third leg 125 and/or encapsulating the respective portion of the internal structure body 120 of the first leg 123 and/or the third leg 125 form an open profile being open in the forward direction with respect to the aircraft's longitudinal orientation. Likewise, the symmetrical halves 121 and 122 in the area forming the second leg 124 and/or the fourth leg 126 and/or encapsulating the respective portion of the internal structure body 120 of the second leg 124 and/or the fourth leg 126 form an open profile being open in the rearward direction with respect to the aircraft's longitudinal orientation.

Accordingly, the symmetrical halves 121 and 122 in the area forming the first leg 123 and/or the third leg 125 and/or encapsulating the respective portion of the internal structure body 120 of the first leg 123 and/or the third leg 125 form an open profile being closed in the rearward direction with respect to the aircraft's longitudinal orientation. Likewise, the symmetrical halves 121 and 122 in the area forming the second leg 124 and/or the fourth leg 126 and/or encapsulating the respective portion of the internal structure body 120 of the second leg 124 and/or the fourth leg 126 form an open profile being closed in the forward direction with respect to the aircraft's longitudinal orientation.

Furthermore as may be seen in FIG. 29, the leg portion 102 comprises recesses 129a for receiving frame coupling elements 161 and 171 of the respective rotary joints 160 and 170. Said frame coupling elements 161 and 171 are configured to couple the leg portion 102 with the frame portion 103 via leg coupling fixtures 162 and 172 of the frame portion 103, which leg coupling fixtures 162 and 172 are also part of the rotary joints 160 and 170. Furthermore as may be seen in FIG. 29, the leg portion 102 comprises recesses 129b for receiving foot portions 127 and 128, particularly floor coupling elements 127a and 128a, which are configured to couple the leg portion 102 with a rail 5 provided at an aircraft floor. Each of the recesses 129a and 129b is formed by the free ends of the legs 123, 124, 125 and 126, wherein the frame coupling elements 161 and 171 and/or the floor coupling elements 127a and 128a are each fixedly attached within the respective recesses 129a and 129b. Each frame coupling element 161 and 171 comprises a supporting portion, which is inserted into the recess 129a of the respective leg 125 and 126, and a connecting portion with a through hole 161a and 171a for a bolt or a screw 163, 173, wherein the supporting portion has an exterior shape being complementary to an interior shape of the recesses 129a of the legs 125 and 126, so as to fit snugly into the respective leg 125, 126.

Figure 30:
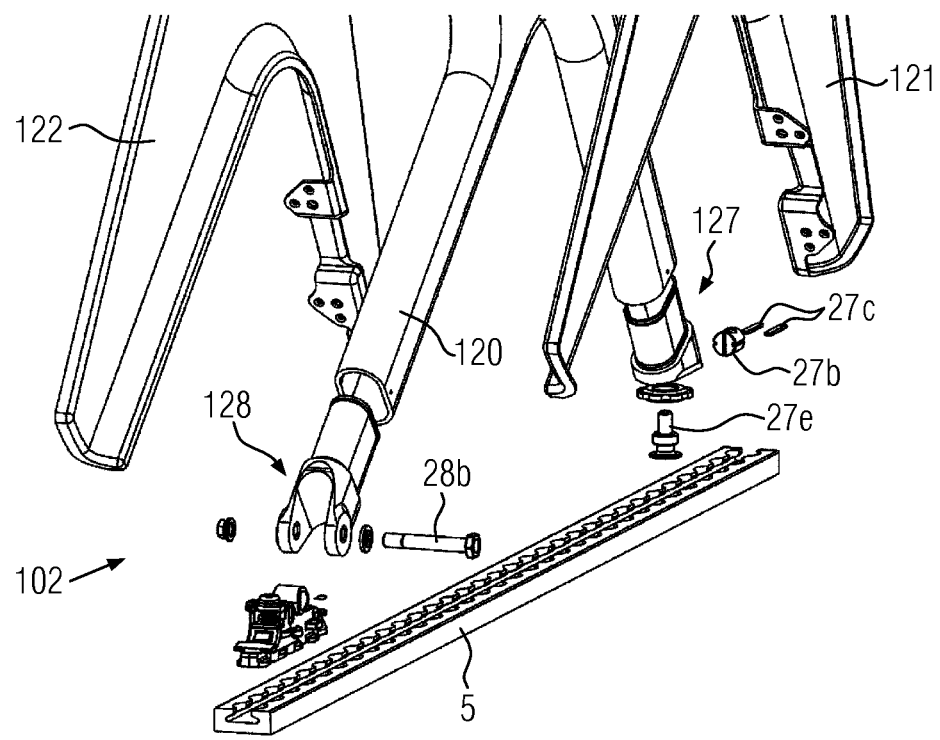
FIG. 30 is a partial perspective exploded view of the leg portion of FIG. 29, combined with other parts of the respective front and rear foot portions, and the corresponding rail.
Figure 31:
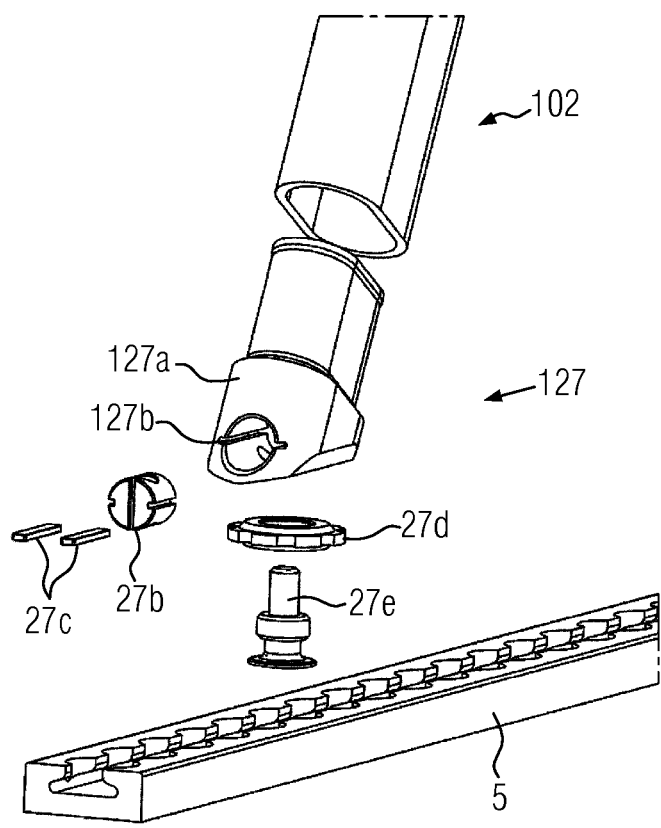
FIG. 31 is another enlarged partial perspective exploded view of the front leg of the leg portion of FIG. 30, combined with parts of the respective front foot portion and the corresponding rail.

As may be comprehended from FIG. 30 and FIG. 31, the foot portions 127 and 128 of a lightweight aircraft passenger seat assembly according to the second embodiment comprise floor coupling elements 127a, 128a, which are each fixedly attached within a recess at the free end of at least one of the first and the second leg 123 and 124. Each one of the floor coupling elements 127a and 128a comprises a supporting portion, which is inserted into the recess 129b of the respective leg, and a connecting portion with a through hole 127b, 128b for a nut, bolt or a screw, wherein the supporting portions preferably have exterior shapes, which are complementary to an interior shape of the recess 129b of the respective leg 123, 124, so as to fit snugly into said leg 123, 124.

Also, in the case of the second embodiment of the present invention the forward foot portion 127 is different from the rearward foot portion 128 of the same leg portion 102. The axis of rotation of the rotary joints (provided by the through holes 127b) formed by the forward foot portions 127 is parallel to the aircraft's roll axis. However, the rotation is regularly blocked in one angular position by at least one blocking element 27c and is only released upon application of an excessive force beyond a predetermined load level to the blocking element 27c, so that the blocking element 27c fails upon application of the excessive force. To establish this blocking, a barrel nut 27b is received in a cavity or through hole 127b of the foot coupling element 127a in a rotatable fashion and connects to a bolt 27e to be secured to the aircraft floor rail 5. The rotation of the barrel nut 27b is blocked in the predetermined angular position relative to the foot coupling element 127a by means of two shear plates 27c acting as blocking elements 27c, wherein the two shear plates 27c are designed to fail upon application of the excessive force, so as to allow the barrel nut 27b to rotate relative to the foot coupling element 127a.

Figure 32:
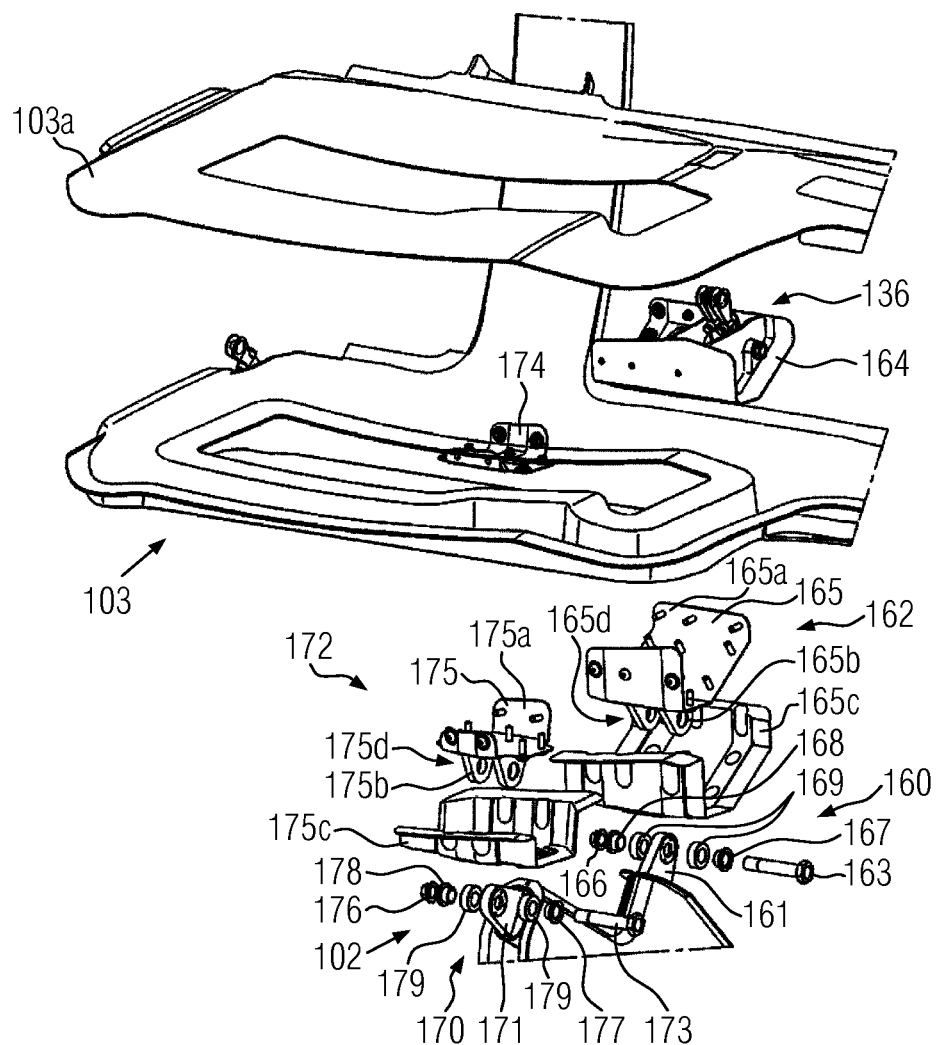
FIG. 32 is an enlarged partial perspective exploded view of the frame portion and the leg portion of the second embodiment of the present invention combined with parts of passenger safety belt fixtures.
Figure 33:
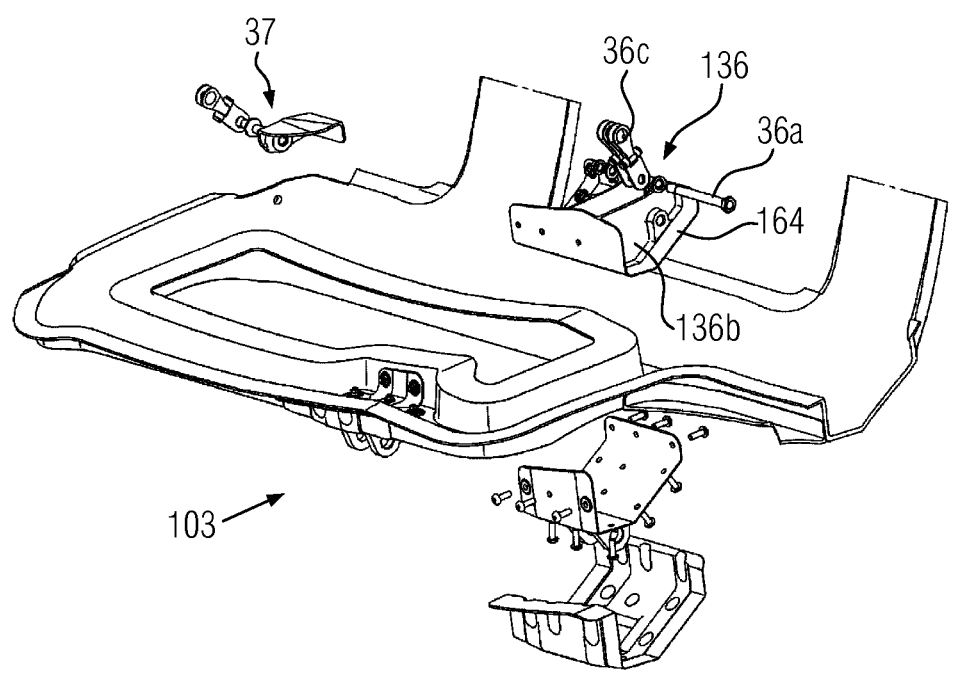
FIG. 33 is a further enlarged partial perspective exploded view of the frame portion of the second embodiment of the present invention combined with parts of passenger safety belt fixtures.
Figure 34:
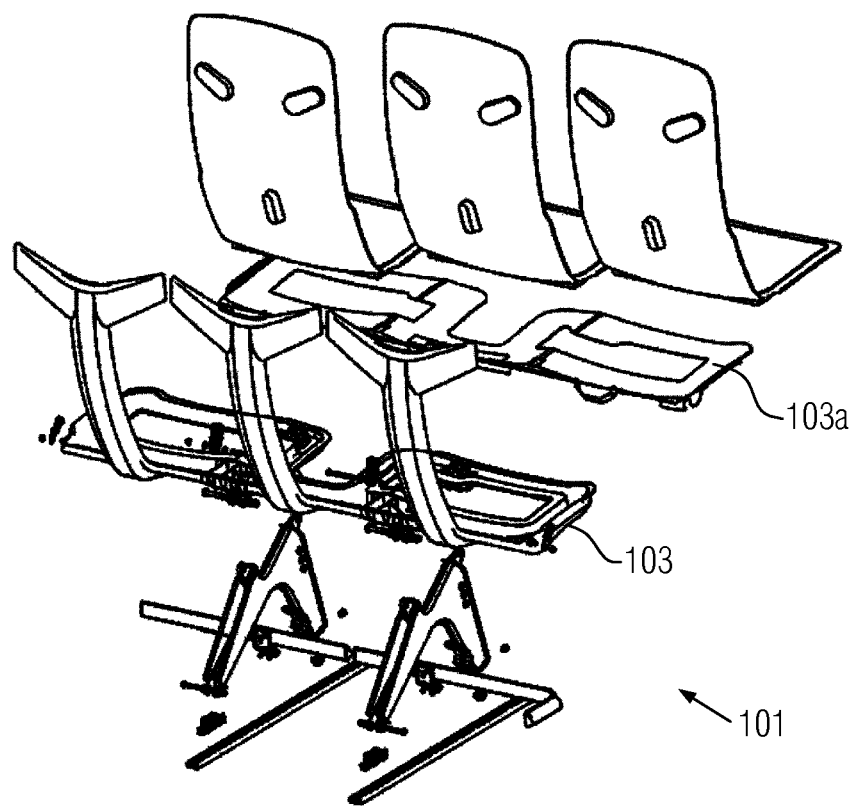
FIG. 34 is a perspective exploded rear view of the lightweight aircraft passenger seat assembly according to a second embodiment of the present invention, including a supporting portion and three seat portions.

Now referring to FIG. 32 to FIG. 34 the frame portion 103 according to the second embodiment of the present invention comprises at least one leg coupling fixture 162, 172, which is configured to couple the frame portion 103 with the leg portion 102 of the seat assembly 101, in particular with a frame coupling element 161, 171 of the leg portion 102. As may be seen in FIGS. 32 and 33, the leg coupling fixtures 162 and 172 are bolted with the beam portion 31 and/or with the loop portion 32, particularly with the straight portion of the loop portion 32. More particularly, the frame portion 103 comprises two leg coupling fixtures 162 and two leg coupling fixtures 172, wherein the leg coupling fixtures 172 are configured to be coupled to a frame coupling element 171 of the leg portion 102 which is inserted in the recess of a third leg 125 and wherein the leg coupling fixtures 162 are configured to be coupled to a frame coupling element 161 of the leg portion 102 which is inserted in the recess of a fourth leg 126.

Furthermore, as shown in FIGS. 32 and 33, the leg coupling fixtures 162 and 172 respectively comprise an inlay element 164, 174 and a cap element 165, 175, wherein each inlay element 164, 174 is configured to be inserted into the beam portion and/or the loop portion of the frame portion 103 from the upper side thereof. Each cap element 165, 175 is preferably configured to be attached to the beam portion and/or the loop portion of the frame portion 103 from the lower side thereof. Thereby, the respective cap element 165, 175 is clinched and/or bolted to the respective inlay element 164, 174, wherein the respective inlay element 164, 174 and the respective cap element 165, 175 enclose a section of the beam portion and/or the loop portion of the frame portion 103 to form sandwich structure.

Each cap element 165, 175 comprises a supporting portion 165a, 175a and two connecting portions 165b, 175b, respectively, wherein the supporting portions 165a, 175a are configured to support the respective cap element 165, 175 relative to the beam portion and/or the loop portion of the frame portion 103 and, therefore, the supporting portions 165a, 175a have a shape complementary to an exterior shape of the beam portion and/or the loop portion of the frame portion 103, so as to fit snugly thereon from a lower side. The cap elements 165, 175 may be covered with a cover element 165c, 175c, wherein the connecting portions 165b, 175b may protrude from the respective supporting portion 165a, 175b through a recess in the respective cover element 165c, 175c. The connecting portions 165b, 175b each have a through hole 165d, 175d for a bolt or a screw 163, 173, Also, the cover elements 165c, 175c have shapes complementary to an exterior shape of the beam portion and/or the loop portion of the frame portion 103 and/or the respective cap element 165, 175, so as to fit snugly thereon from a lower side.

As already mentioned above, the leg coupling fixtures 162 and 172 are part of the rotary joints 160 and 170, respectively, and thus form rotary joints 160 and 170 which are configured to rotate the frame portion 103 relative to the leg portion 102. Thus, the leg portion 102 is coupled to the frame portion 103 via at least one rotary joint 160, 170. Though, each rotary joint 160, 170 comprises a frame coupling element 161, 171 of the leg portion 102, a leg coupling fixture 162, 172 of the frame portion 103 and a link member 163, 173, which is configured to couple the frame coupling element 161, 171 and the respective leg coupling fixture 162, 172. At least one of the components of the rotary joints 160, 170 may be made from a metal material.

The link member 163, 173 may be formed by a screw or a bolt, wherein the link member is inserted into the through hole of the frame coupling element 161, 171 and the through hole of the leg coupling fixture 162, 172. Each of the rotary joints 160, 170 may also comprise a nut 166, 176, which is configured to be screwed onto the respective link member 163, 173 of the respective rotary joint 160, 170. Also, each of the rotary joints 160, 170 may comprise a washer ring 167, 177, wherein said washer ring 167, 177 may be arranged between the head of the link member 163, 173 and a connecting portion 165b, 175b of the leg coupling fixture 162, 172. At least one washer ring 168, 178 may also be arranged between the nut 166, 176 and a connecting porting 165b, 175b of the leg coupling fixture 162, 172. Also, at least one washer ring may respectively be arranged between the connecting portion 165b, 175b of the leg coupling fixture 162, 172 and the connecting portion of the frame coupling element 161, 171.

It is conceivable that the rotary joint 160, 170 is configured to rotate the frame portion 103 relative to the leg portion 102, wherein the axis of rotation is formed by the length axis of the respective link member 163, 173. Thereby, the axis of rotation of each of the rotary joints 160 and 170 is preferably substantially parallel, including a tolerance of up to 20°, to an aircraft floor, preferably parallel to the aircraft's pitch axis, wherein the rotary joint preferably enables rotation of the frame portion 103 relative to the frame portion by an angle of up to +10° and/or −10°, preferably at least +5° and/or −5° and preferably of up to +15° and/or −15°, as measured from a regular position.

In order to allow according rotation of the frame portion 103 relative around the leg portion 102 around an axis of rotation, which is orthogonal to the length axis of the link members 163, 173, by an angle of up to +10° and/or −10°, preferably at least +5° and/or −5° and preferably of up to +15° and/or −15°, as measured from a regular position, each link member 163, 173 is inserted into the respective through hole of the frame coupling elements 161, 171 and the leg coupling fixtures 162, 172 in a loose tolerance fit. Also for this reason the link members 163, 173 are fastened by the respective nut 166, 176 in a loose tolerance fit. However, this rotation may regularly blocked by at least one blocking element 169, 179 and is only released upon application of an excessive force beyond a predetermined load level to the blocking element 169, 179, wherein each blocking element 169, 179 preferably fails upon application of the excessive force, wherein the blocking elements 169, 179 are preferably formed by a frangible washer.

In contrast to the frame portion 3 of the first embodiment, the frame portion of the second embodiment, as shown in FIG. 32 and FIG. 34, is at least sectionwise covered with a closing panel 103a, wherein the closing panel 103a is bonded or welded to the frame portion 103. Accordingly, the frame portion 103 and the closing panel 103a together form a cross-section with the shape of a closed profile, said cross-section being perpendicular to the length axis of the respective section of the frame portion 103.

As a secondary component of the second embodiment of the present invention, the lightweight aircraft passenger seat assembly 101 further comprises passenger safety belt fixtures 136, 37, whereas the passenger safety belt fixture 37 of the second embodiment may be identical to the passenger safety belt fixture 37 of the first embodiment. On the other hand, passenger safety belt fixtures 136 of the second embodiment may differ to the passenger safety belt fixture 36 of the first embodiment.

Passenger safety belt fixtures 136 of the second embodiment may comprise a bolt 36a for bolting the passenger safety belt to the supporting portion 102, 103, a cover portion 136b for covering a part of the supporting portion 102, 103, so as to spread loads induced from the passenger safety belt across a surface of the supporting portion 102, 103. In particular, the cover portion 136b may be integrally connected to or formed together with the respective inlay element 164 of the rotary joint 160, so that loads induced from the passenger safety belt may directly be absorbed by the leg structure 102. Furthermore, the passenger safety belt fixtures 136 may comprise one or more attachments 36c for attaching parts of the passenger safety belt to it. The attachments 36c will be bolted by a bolt 36a to the cover portion 136b.

The entire disclosure of European Patent No. 13 000 841.0 filed Feb. 19, 2013 is expressly incorporated by reference herein.

What is claimed is:

1. A lightweight aircraft passenger seat assembly comprising:
   at least one seat portion with at least one seat shell for an aircraft passenger; and
   at least one supporting portion for supporting the at least one seat portion relative to an aircraft structure,
   wherein the at least one seat shell and the at least one supporting portion are constructed as lightweight components,
   wherein the seat shell is a one-piece construction including a sitting portion and a backrest portion,
   wherein the seat shell is at least partially made from a fiber reinforced composite material and comprises a first fiber layer, a second fiber layer and a core material between the first fiber layer and the second fiber layer, wherein the core material extends along portions of the sitting portion and along portions of the backrest portion, and wherein a transition region between the backrest portion and the sitting portion is free of the core material, and
   wherein the backrest portion of the seat shell is bonded to a frame portion of the at least one supporting portion, and sitting portion rests on the frame portion of the at least one supporting portion and can slide on the frame portion in a guided fashion so as to be held by friction in individual positions.

2. The lightweight aircraft passenger seat assembly according to claim 1, wherein at least one of the lightweight components forms an integral and/or monolithic body.

3. The lightweight aircraft passenger seat assembly according to claim 1, wherein the at least one supporting portion is made from fiber reinforced composite material.

4. The lightweight aircraft passenger seat assembly according to claim 1, wherein the at least one supporting portion comprises at least one leg portion which has at least one leg.

5. The lightweight aircraft passenger seat assembly according to claim 1, wherein the at least one supporting portion comprises at least one leg portion which has at least two legs to be coupled with an aircraft structure, wherein a first leg is configured to be oriented forward with respect to a longitudinal orientation of the aircraft and a second leg is configured to be oriented rearward with respect to the longitudinal orientation.

6. The lightweight aircraft passenger seat assembly according to claim 5, wherein a third leg is configured to be oriented forward with respect to the longitudinal orientation and a fourth leg is configured to be oriented rearward with respect to the longitudinal orientation, wherein the third and fourth legs are configured to be engaged with a common frame portion.

7. The lightweight aircraft passenger seat assembly according to claim 1, wherein the at least one supporting portion comprises at least one leg portion which is configured to connect to the frame portion of the at least one supporting portion, wherein the leg portion connects to a loop portion of the frame portion and/or to a portion of the frame portion apart from a beam portion.

8. The lightweight aircraft passenger seat assembly according to claim 1, wherein the frame portion includes at least one beam portion, which extends along a line in a widthwise orientation.

9. The lightweight aircraft passenger seat assembly according to claim 1, wherein the at least one supporting portion comprises at least one leg portion, wherein the leg portion is coupled to the frame portion of the supporting portion via at least one rotary joint.

10. The lightweight aircraft passenger seat assembly according to claim 1, wherein the lightweight aircraft passenger seat assembly comprises at least one foot portion which is configured to couple the at least one supporting portion with a rail provided at an aircraft floor.

11. The lightweight aircraft passenger seat assembly according to claim 1,
   wherein the first fiber layer comprises a cut-out in an area of a force application portion and wherein the force application portion is covered by the second fiber layer.

12. The lightweight aircraft passenger seat assembly according to claim 1, wherein the supporting portion comprises at least one leg portion made from a fiber reinforced composite material, wherein the at least one leg portion has at least two hollow legs, and wherein at least a portion of at least one fiber layer continuously extends over the at least two legs free of intersections.

13. The lightweight aircraft passenger seat assembly according to claim 1, further comprising a foot portion configured to couple the at least one supporting portion of the lightweight aircraft passenger seat assembly with a rail provided at an aircraft floor,
- wherein the foot portion forms a rotary joint, wherein a barrel nut is received in a cavity of a housing in a rotatable fashion and is connected to a bolt to be secured to an aircraft structure, wherein the rotation of the barrel nut is blocked in a predetermined angular position relative to the housing by at least one shear plate acting as a blocking element, and wherein the at least one shear plate fails upon application of an excessive force beyond a predetermined load level, so as to allow the barrel nut to rotate relative to the housing.

14. The lightweight aircraft passenger seat assembly according to claim 1, wherein the frame portion comprises a single beam portion and two closed loop portions which are arranged at opposite ends of said single beam portion, wherein said single beam portion is twistable by a twisting angle equal to or greater than 5° as measured from an untwisted state.

\* \* \* \* \*